United States Patent
Yamasuge

(10) Patent No.: US 8,180,286 B2
(45) Date of Patent: May 15, 2012

(54) WIRELESS POWER AND COMMUNICATION SYSTEM

(75) Inventor: Hiroyuki Yamasuge, Tokyo (JP)

(73) Assignee: Sony Corporation, Tokyo (JP)

( * ) Notice: Subject to any disclaimer, the term of this patent is extended or adjusted under 35 U.S.C. 154(b) by 505 days.

(21) Appl. No.: 12/425,140

(22) Filed: Apr. 16, 2009

(65) Prior Publication Data

US 2009/0264069 A1 Oct. 22, 2009

(30) Foreign Application Priority Data

Apr. 17, 2008 (JP) ................................ P2008-108135

(51) Int. Cl.
*H04B 5/00* (2006.01)
(52) U.S. Cl. .................... 455/41.1; 307/104; 320/108
(58) Field of Classification Search .............. 455/41.1, 455/41.2, 41.3, 522; 307/104; 320/108
See application file for complete search history.

(56) References Cited

U.S. PATENT DOCUMENTS

| | | | | |
|---|---|---|---|---|
| 5,963,012 A * | 10/1999 | Garcia et al. | ................ | 320/106 |
| 6,427,065 B1 * | 7/2002 | Suga et al. | ................ | 455/41.1 |
| 2008/0200119 A1 * | 8/2008 | Onishi et al. | ................ | 455/41.1 |
| 2009/0146608 A1 * | 6/2009 | Lee | ................ | 320/108 |
| 2010/0201204 A1 * | 8/2010 | Sakoda et al. | ................ | 307/104 |
| 2010/0201513 A1 * | 8/2010 | Vorenkamp et al. | ...... | 340/539.13 |
| 2010/0225172 A1 * | 9/2010 | Kozuma et al. | ................ | 307/104 |
| 2010/0244580 A1 * | 9/2010 | Uchida et al. | ................ | 307/104 |
| 2010/0259217 A1 * | 10/2010 | Baarman et al. | ............. | 320/108 |
| 2011/0057606 A1 * | 3/2011 | Saunamaki | .................... | 320/108 |
| 2011/0089769 A1 * | 4/2011 | Kwon et al. | ................ | 307/104 |
| 2011/0109167 A1 * | 5/2011 | Park et al. | ................ | 307/104 |
| 2011/0115433 A1 * | 5/2011 | Lee et al. | ................ | 320/108 |
| 2011/0115891 A1 * | 5/2011 | Trusty | .......................... | 348/65 |
| 2011/0184842 A1 * | 7/2011 | Melen | ............................ | 705/34 |
| 2011/0193688 A1 * | 8/2011 | Forsell | ........................ | 340/10.4 |

FOREIGN PATENT DOCUMENTS

| | | |
|---|---|---|
| JP | 2003-047177 | 2/2003 |
| JP | 2006-517378 | 7/2006 |
| JP | 2006-217393 | 8/2006 |
| JP | 2006-238548 | 9/2006 |
| JP | 2007-329983 | 12/2007 |

* cited by examiner

*Primary Examiner* — Lincoln Donovan
*Assistant Examiner* — William Hernandez
(74) *Attorney, Agent, or Firm* — Finnegan, Henderson, Farabow, Garrett & Dunner, L.L.P.

(57) ABSTRACT

The present invention provides a wireless communication apparatus including: a communication processing unit that transmits and receives a radio signal; a wireless power transmitting unit that supplies power wirelessly to an apparatus located within a power supplyable range; a location data obtaining unit that obtains location data of a power receiver apparatus; and a control unit that controls a power supply to the power receiver apparatus based on the location data of the power receiver apparatus obtained by the location data obtaining unit.

23 Claims, 23 Drawing Sheets

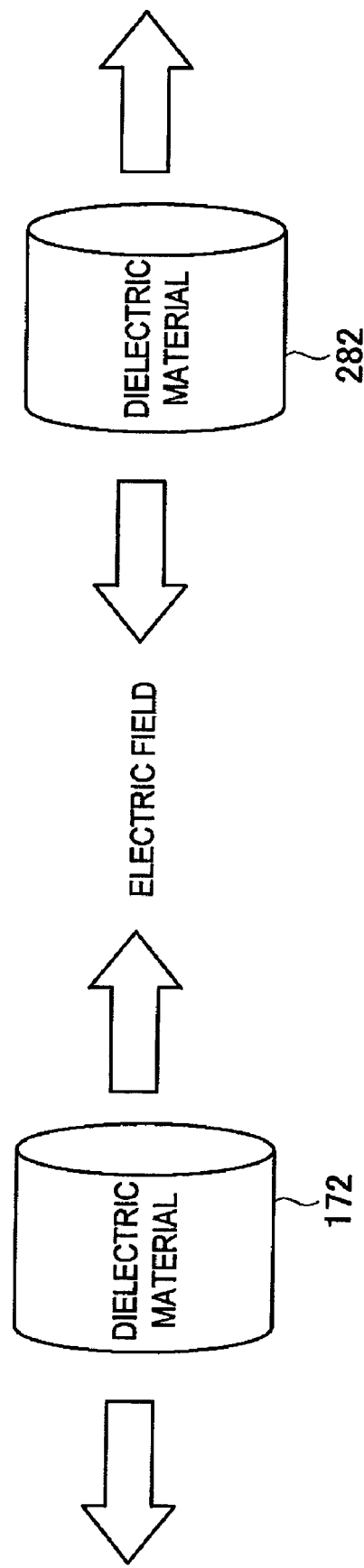

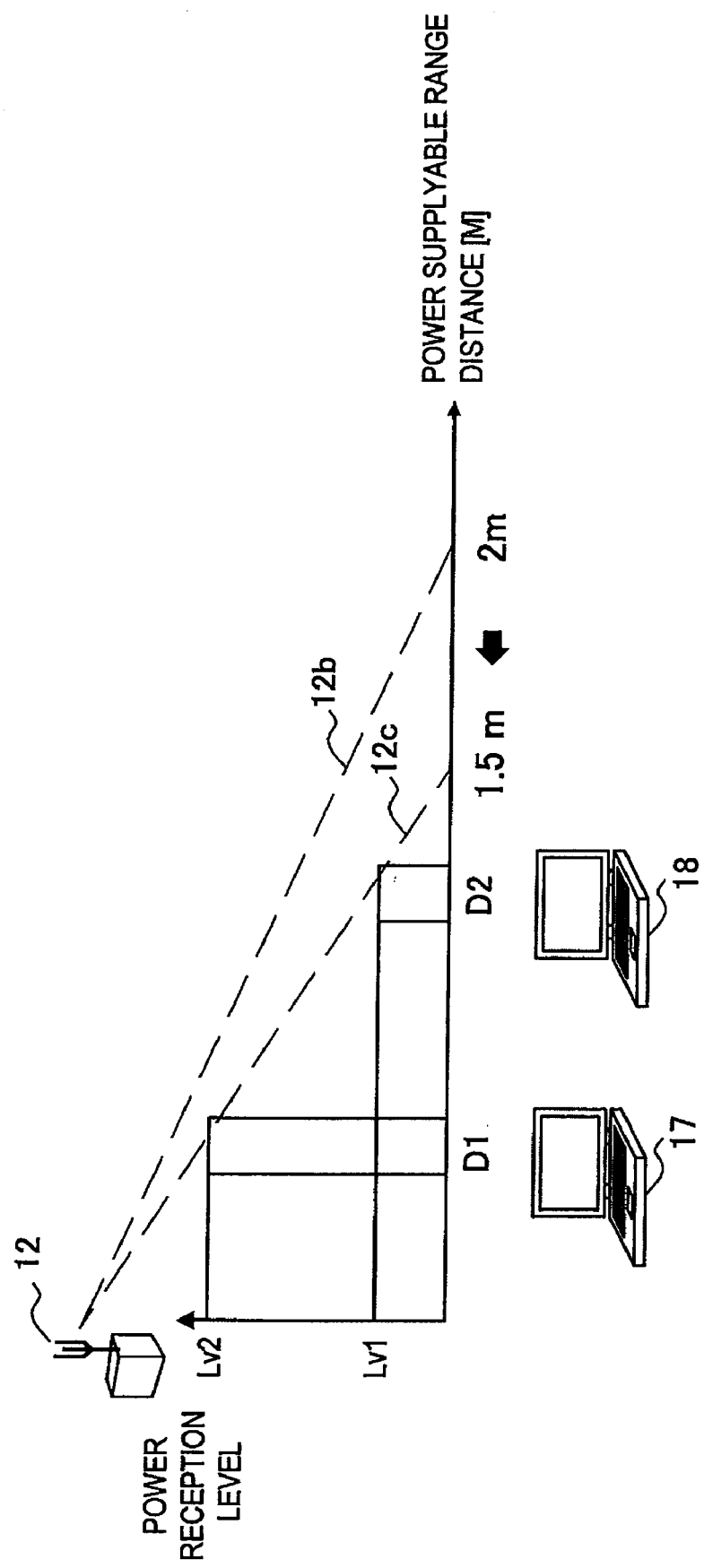

WIRELESS POWER AND COMMUNICATION SYSTEM

BACKGROUND OF THE INVENTION

1. Field of the Invention

The present invention relates to a wireless communication apparatus, a method for supplying power, a program, and a wireless communication system.

2. Description of the Related Art

In the past, wireless power supply techniques have been developed that enable power supply without a physical connection or contact between apparatuses. For supplying power wirelessly, there is a method that performs wireless power supply through, for example, an electromagnetic wave such as a microwave, ultrasound, a resonant magnetic field or electric field, or laser light.

In such wireless power supply techniques, since generally power loss occurs in space, when the distance between a power transmitting apparatus and a power receiving apparatus increases, efficiency of power supply decreases. Further, when the power transmitting apparatus and the power receiving apparatus are separated from each other by a certain distance or more, power supply may not be able to be performed. In view of this point, for example, Japanese Patent Application Laid-Open No. 2006-238548 discloses a technique in which a unit that wirelessly transmits a detection result of a power reception status to a power transmitting apparatus is provided to a power receiving apparatus and the power reception status is displayed on the power transmitting apparatus, whereby a user is guided to a more efficient location.

SUMMARY OF THE INVENTION

However, to enhance power supply efficiency using the technique described in JP-A No. 2006-238548, a user who has looked a power reception status displayed on a power transmitting apparatus may be requested to move carrying the power transmitting apparatus or a power receiving apparatus with himself/herself. Further, when the power receiving apparatus is located outside a power supplyable range from a power transmitting apparatus, power supply itself may not be able to be performed.

The present invention has been made in views of such issues, and it is desirable to provide a new and improved wireless communication apparatus, a method for supplying power, a program, and a wireless communication system that are capable of performing power supply by a plurality of wireless communication apparatuses cooperating with each other.

According to an embodiment of the present invention, there is provided a wireless communication apparatus including: a communication processing unit that transmits and receives a radio signal; a wireless power transmitting unit that supplies power wirelessly to an apparatus located within a power supplyable range; a location data obtaining unit that obtains location data of a power receiver apparatus; and a control unit that controls a power supply to the power receiver apparatus based on the location data of the power receiver apparatus obtained by the location data obtaining unit.

According to this configuration, the location data obtaining unit obtains location data of a power receiver apparatus and the control unit controls power supply to the power receiver apparatus based on the location data of the power receiver apparatus output from the location data obtaining unit. For example, when power is supplied to the power receiver apparatus from the wireless communication apparatus, power can be wirelessly supplied to the power receiver apparatus from the wireless power transmitting unit. When power is supplied to the power receiver apparatus from another wireless communication apparatus, the wireless communication apparatus can cooperate with the another wireless communication apparatus through the communication processing unit.

When the control unit determined based on the location data that the power receiver apparatus is within a power supplyable range from another wireless communication apparatus, the control unit may transmit a power supply request signal requesting a power supply for the power receiver apparatus to the another wireless communication apparatus.

When the control unit determined based on the location data that the power receiver apparatus is within a power supplyable range from another wireless communication apparatus, the control unit may further transmit the location data to the another wireless communication apparatus.

When the control unit determined that the another wireless communication apparatus is within a power supplyable range from the wireless communication apparatus, the control unit may further let the wireless power transmitting unit supply power to the another wireless communication apparatus.

When the control unit determined that the power receiver apparatus is within a power supplyable range from the wireless communication apparatus, the control unit may further let the wireless power transmitting unit supply power to the power receiver apparatus.

The control unit may determine whether to perform power supply, using contract data, circuit data, or amount-of-remaining-power data which are transmitted from the power receiver apparatus.

When the control unit received a power supply request signal requesting a power supply for the power receiver apparatus, from another wireless communication apparatus, the control unit may let the wireless power transmitting unit supply power to the power receiver apparatus.

The wireless communication apparatus may further include a wireless power receiving unit that receives a power supply from another wireless communication apparatus, and when the control unit received the power supply request signal from the another wireless communication apparatus, the control unit may let the wireless power receiving unit receive a power supply from the another wireless communication apparatus and let the wireless power transmitting unit supply power to the power receiver apparatus.

The location data obtaining unit may obtain location data contained in a radio signal received from the another wireless communication apparatus through the communication processing unit.

The location data obtaining unit may estimate location data of the power receiver apparatus, using a radio signal received from the power receiver apparatus through the communication processing unit.

According to another embodiment of the present invention, there is provided A method for supplying power including the steps of: obtaining location data of a power receiver apparatus, using a radio signal; controlling a power supply to the power receiver apparatus based on the obtained location data of the power receiver apparatus; and supplying power wirelessly to the power receiver apparatus when the power receiver apparatus is located within a power supplyable range from a wireless communication apparatus.

According to another embodiment of the present invention, there is provided a program causing a computer that controls a wireless communication apparatus to function as: a communication processing unit that transmits and receives a radio signal; a power transmission control unit that controls a power supply from a wireless power transmitting unit to an apparatus located within a power supplyable range; a location data obtaining unit that obtains location data of a power receiver apparatus; and a control unit that provides instructions for supplying power to the power receiver apparatus, to the power transmission control unit based on the location data of the power receiver apparatus obtained by the location data obtaining unit.

According to another embodiment of the present invention, there is provided a wireless communication system including: a first wireless communication apparatus including: a first communication processing unit that transmits and receives a radio signal; a first wireless power transmitting unit that supplies power wirelessly to an apparatus located within a power supplyable range from the first wireless communication apparatus; a first location data obtaining unit that obtains location data of a power receiver apparatus; and a first control unit that controls a power supply to the power receiver apparatus based on the location data of the power receiver apparatus obtained by the first location data obtaining unit, a second wireless communication apparatus including: a second communication processing unit that transmits and receives a radio signal; and a second wireless power transmitting unit that supplies power to the power receiver apparatus, after receiving a power supply request signal requesting a power supply for the power receiver apparatus, from the first wireless communication apparatus, and the power receiver apparatus including: a wireless power receiving unit that wirelessly receives a power supply from the first wireless power transmitting unit of the first wireless communication apparatus or the second wireless power transmitting unit of the second wireless communication apparatus.

As described above, according to the wireless communication apparatus, a method for supplying power, a program, and a wireless communication system according to the embodiments of the present invention, power supply can be performed by a plurality of wireless communication apparatuses cooperating with each other.

BRIEF DESCRIPTION OF THE DRAWINGS

FIG. 22 is a block diagram showing a fourth exemplary configuration of the power transmitting circuit and the power receiving circuit; and FIG. 23 is a schematic diagram showing an example of a process of dynamically updating a power supplyable range.

DETAILED DESCRIPTION OF THE PREFERRED EMBODIMENTS

Figure 1:
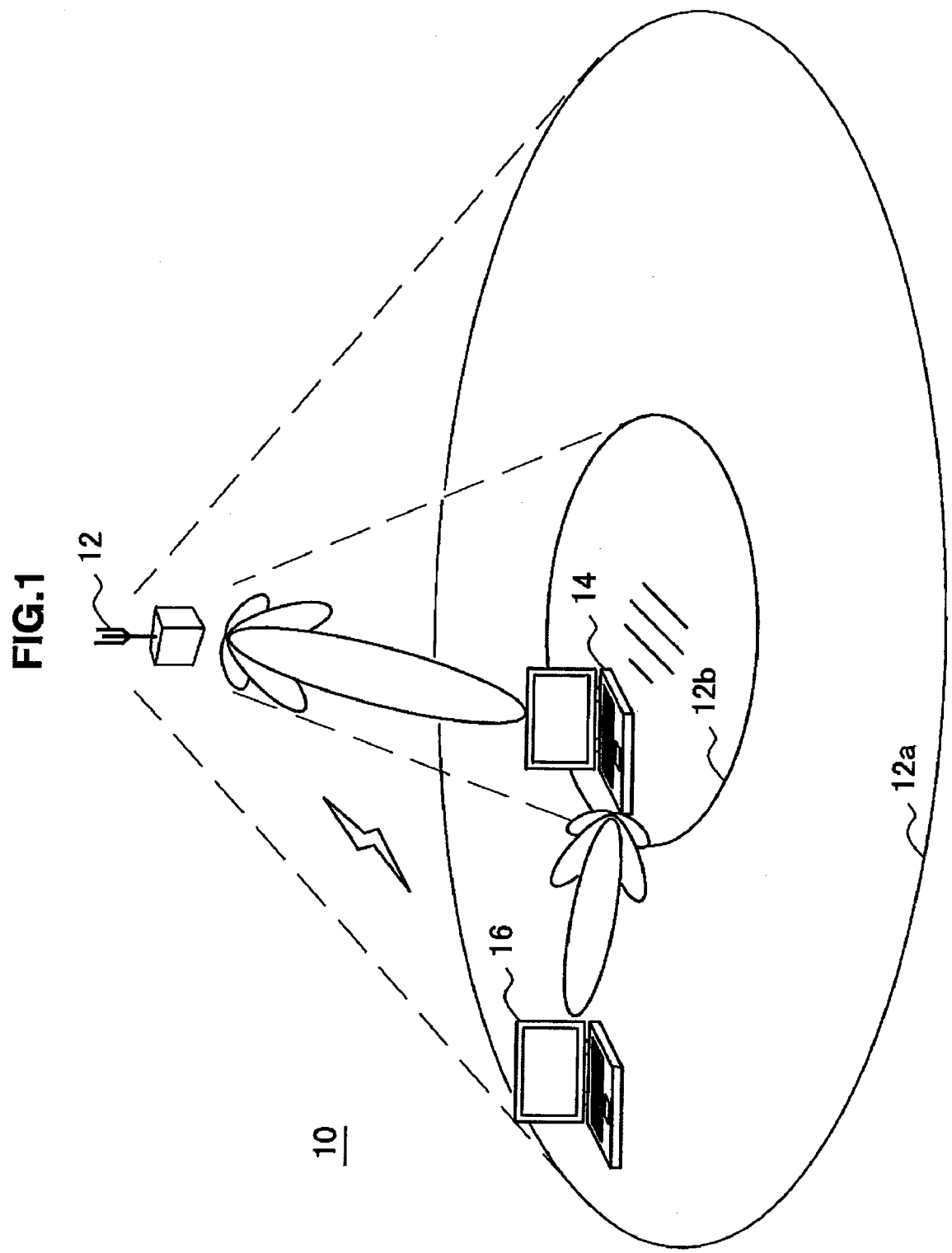
FIG. 1 is an explanatory diagram showing an overview of a wireless communication system according to a first embodiment.

Hereinafter, preferred embodiments of the present invention will be described in detail with reference to the appended drawings. Note that, in this specification and the appended drawings, structural elements that have substantially the same function and structure are denoted with the same reference numerals, and redundant explanation of these structural elements is omitted.

[1] First Embodiment

First, FIG. 1 is an explanatory diagram showing a configuration of a wireless communication system 10 according to a first embodiment of the present invention. The wireless communication system 10 shown in FIG. 1 includes a first wireless communication apparatus 12, a second wireless communication apparatus 14, and a power receiver apparatus 16.

Although in FIG. 1 a wireless access point is shown as the first wireless communication apparatus 12, the first wireless communication apparatus 12 is not limited to a wireless access point. The first wireless communication apparatus 12 may be, for example, a network apparatus such as a router having a wireless communication function, a data processing apparatus such as a PC (Personal Computer) or workstation, or a household appliance such as a music/video player or phone.

Further, although in FIG. 1 PCs are shown as the second wireless communication apparatus 14 and the power receiver apparatus 16, the second wireless communication apparatus 14 and the power receiver apparatus 16 are not limited to PCs. These apparatuses may be, for example, portable devices such as mobile phone terminals, personal digital assistants, or game terminals, or the aforementioned apparatuses exemplified in connection with the first wireless communication apparatus 12.

The first wireless communication apparatus 12 can communicate with the second wireless communication apparatus 14 and the power receiver apparatus 16, using a radio signal. The second wireless communication apparatus 14 can also communicate with the power receiver apparatus 16, using a radio signal. These wireless communications can be implemented by, for example, a wireless LAN that complies with IEEE802.11a,b,g,n standards.

The first wireless communication apparatus 12 can wirelessly supply power to an apparatus located therearound. Consequently, for the power receiving apparatus, even when the amount of remaining power is short, the operation thereof is kept up without performing a battery change, connection of a power supply cable, or the like. Wireless power supply from the first wireless communication apparatus 12 is performed through, for example, an electromagnetic wave such as a microwave, ultrasound, a resonant magnetic field or electric field, or laser light. The configurations of a power transmitting circuit and a power receiving circuit for performing such wireless power supply will be described in detail later.

Generally, a range in which power can be wirelessly supplied is narrower than a range in which wireless communication can be performed. Referring to FIG. 1, an area 12a and an area 12b are shown that are depicted as ellipses under the first wireless communication apparatus 12. The area 12a represents a range in which wireless communication can be performed with the first wireless communication apparatus 12. That is, both the second wireless communication apparatus 14 and the power receiver apparatus 16 within the area 12a can perform wireless communication with the first wireless communication apparatus 12. On the other hand, the area 12b represents a range in which power can be wirelessly supplied from the first wireless communication apparatus 12. That is, while power can be supplied from the first wireless communication apparatus 12 to the second wireless communication apparatus 14 located within the area 12b, power may not be able to be supplied from the first wireless communication apparatus 12 to the power receiver apparatus 16 located outside the area 12b.

Under such circumstances, in the present embodiment, the first wireless communication apparatus 12 recognizes a location of the power receiver apparatus 16 and performs power supply to the power receiver apparatus 16, using the second wireless communication apparatus 14 located near the power receiver apparatus 16, instead of using the first wireless communication apparatus 12 itself. The first wireless communication apparatus 12, the second wireless communication apparatus 14, and the power receiver apparatus 16 according to the present embodiment will be described in detail below with reference to FIGS. 2 to 14.

Figure 2:
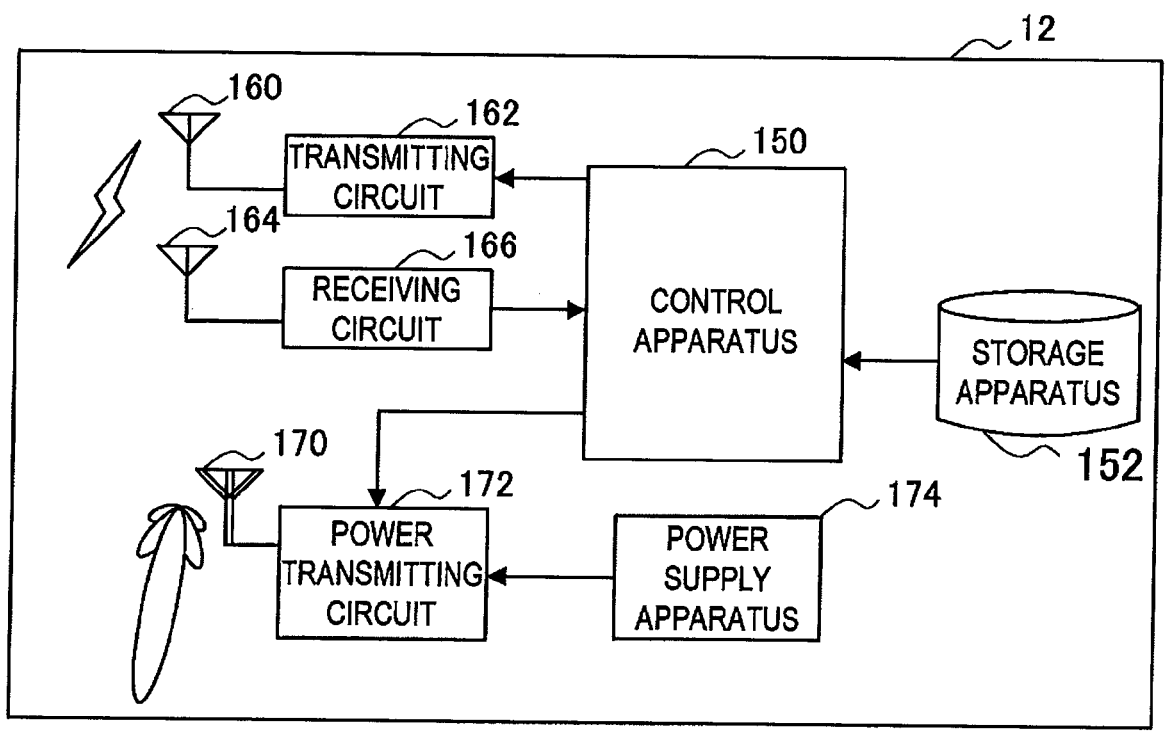
FIG. 2 is a block diagram showing an example of a hardware configuration of a first wireless communication apparatus.

FIG. 2 is a block diagram showing an example of a hardware configuration of the first wireless communication apparatus 12. Referring to FIG. 2, the first wireless communication apparatus 12 includes a control apparatus 150, a storage apparatus 152, a transmitting antenna 160, a transmitting circuit 162, a receiving antenna 164, a receiving circuit 166, a power transmitting antenna 170, a power transmitting circuit 172, and a power supply apparatus 174.

The control apparatus 150 of the first wireless communication apparatus 12 is connected to the storage apparatus 152, the transmitting circuit 162, the receiving circuit 166, and the power transmitting circuit 172. A detailed hardware configuration of the control apparatus 150 will be described using FIG. 3.

Figure 3:
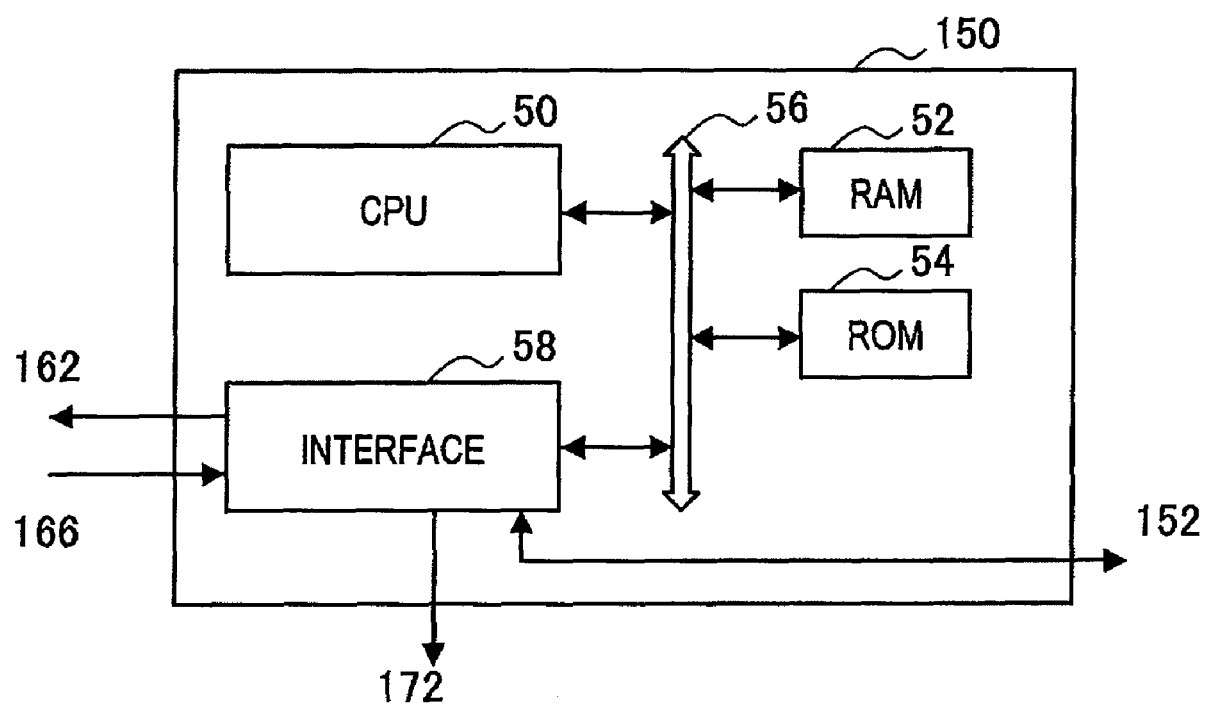
FIG. 3 is a block diagram showing an example of a hardware configuration of a control apparatus.

FIG. 3 is a diagram showing a detailed hardware configuration of the control apparatus 150 of the first wireless communication apparatus 12. Referring to FIG. 3, the control apparatus 150 includes a CPU (Central Processing Unit) 50, a RAM (Random Access Memory) 52, a ROM (Read Only Memory) 54, a bus 56, and an interface 58.

The CPU 50 functions as an arithmetic processing apparatus and controls overall operations in the first wireless communication apparatus, according to various programs. The CPU 50 may be a microprocessor. The RAM 52 temporarily stores a program, data, etc., used by the CPU 50 to perform a computing process. In the ROM 54, a program that describes part or all of a process performed by the first wireless communication apparatus 12, and the like are stored. These components are interconnected via the bus 56.

The interface 58 is an interface for connecting the control apparatus 150 to the storage apparatus 152, the transmitting circuit 162, the receiving circuit 166, and the power transmitting circuit 172. For example, data stored in the storage apparatus 152 is read by the CPU 50 through the interface 58. A signal generated by the CPU 50 is output to the transmitting circuit 162 through the interface 58. A signal demodulated and decoded by the receiving circuit 166 is input to the CPU 50 through the interface 58. A signal instructing, by the CPU 50, the power transmitting circuit 172 to perform power transmission is output to the power transmitting circuit 172 through the interface 58.

Though not shown here, an input apparatus and an output apparatus may be further connected to the CPU 50 through the interface 58.

Returning to FIG. 2, the description of the hardware configuration of the first wireless communication apparatus 12 is continued. The storage apparatus 152 is an apparatus for storing data or programs and is configured by, for example, a hard disk drive or a flash memory.

The transmitting antenna 160 is connected to the transmitting circuit 162 and is used for transmitting a radio signal from the first wireless communication apparatus 12. The transmitting circuit 162 performs encoding, modulation, etc., for a transmitted signal based on an instruction from the control apparatus 150 and then outputs a radio signal from the transmitting antenna 160.

The receiving antenna 164 is connected to the receiving circuit 166 and receives a radio signal in a predetermined frequency band. The receiving circuit 166 performs demodulation, decoding, etc., for a signal received by the receiving antenna 164 and outputs the processed signal to the control apparatus 150.

Figure 4:
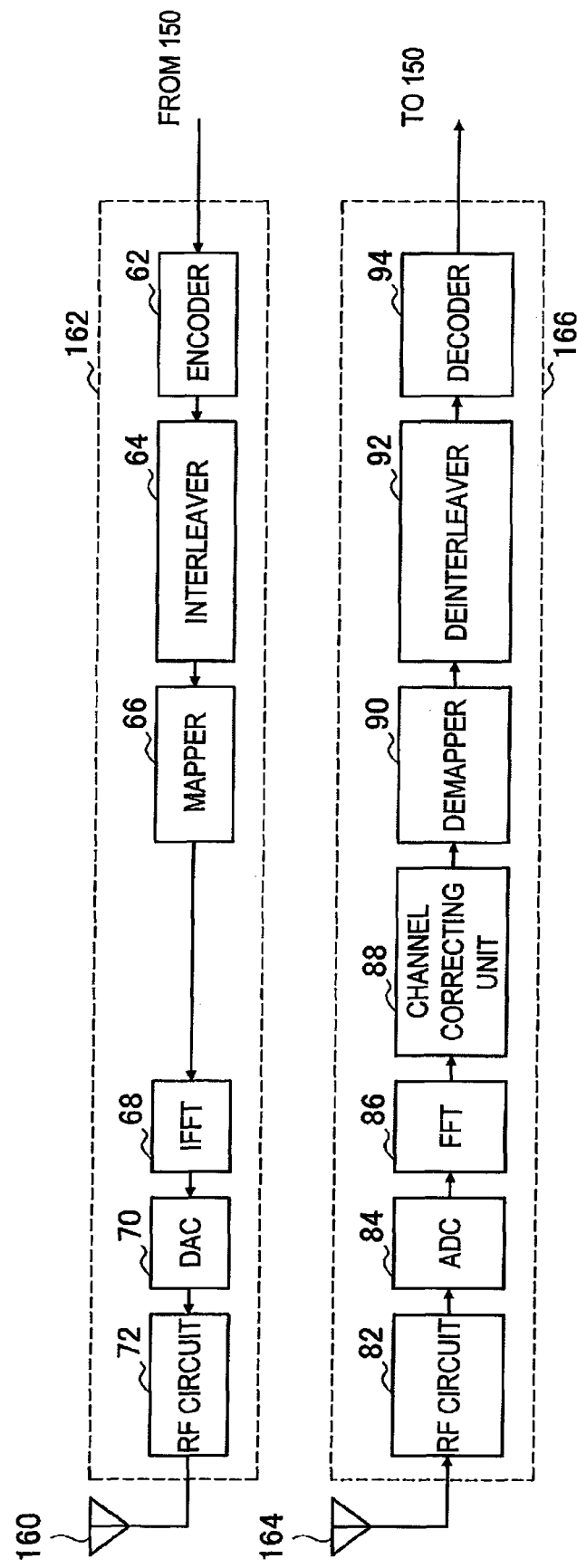
FIG. 4 is a block diagram showing an example of circuit configurations of a transmitting circuit and a receiving circuit.

FIG. 4 is a block diagram showing an example of detailed circuit configurations of the transmitting circuit 162 and the receiving circuit 166. Referring to FIG. 4, the transmitting circuit 162 has an encoder 62, an interleaver 64, a mapper 66, an Inverse Fast Fourier Transformer (IFFT) 68, a Digital-to-Analog Converter (DAC) 70, and an RF circuit 72. The receiving circuit 166 has an RF circuit 82, an Analog-to-Digital Converter (ADC) 84, a Fast Fourier Transformer (FFT) 86, a channel correcting unit 88, a demapper 90, a deinterleaver 92, and a decoder 94. Furthermore, the RF circuit 72 of the transmitting circuit 162 is connected to the transmitting antenna 160 and the RF circuit 82 of the receiving circuit 166 is connected to the receiving antenna 164.

Note that instead of the transmitting antenna 160 and the receiving antenna 164, an antenna and an antenna switch may be provided and the antenna may be used in a shared manner by switching the switch upon transmission and reception.

In the transmitting circuit 162, data for transmission (transmitted data) that is generated as a result of a process performed in hierarchies higher than MAC (Media Access Control) is input to the encoder 62 from the control circuit 150. The input transmitted data is encoded by the encoder 62 and the encoded transmitted data is interleaved by the interleaver 64. The interleaved transmitted data is modulated by the mapper 66 and the modulated transmitted data is inverse-fast-Fourier-transformed by the IFFT 68. An output from the IFFT 68 is converted into an analog signal by the DA converter 70 and the analog signal is upconverted by the RF circuit 72 and then the upconverted signal is transmitted from the transmitting antenna 160.

In the receiving circuit 166, a signal received by the receiving antenna 164 is modulated by the RF circuit 82 and the modulated signal is converted into a digital signal by the AD converter 84. The digital signal is fast-Fourier-transformed by the FFT 86 and the fast-Fourier-transformed digital signal is sent to the channel correcting unit 88. The channel correcting unit 88 performs a process of correcting a channel of the received signal. The signal corrected by the channel correcting unit 88 is sent to the demapper 90 where the signal is demodulated. The demodulated signal is sent to the deinterleaver 92. The deinterleaver 92 performs a process of changing the interleaved received signal back to its original form. The received signal output from the deinterleaver 92 is sent to the decoder 94 where the received signal is decoded. An output signal from the decoder 94 is sent to the control circuit 150.

Returning to FIG. 2 again, the description of the hardware configuration of the first wireless communication apparatus 12 is continued. The power transmitting antenna 170 is connected to the power transmitting circuit 172 and is used for supplying power from the first wireless communication apparatus 12. The power transmitting circuit 172 converts power received from the power supply apparatus 174 into energy such as an electromagnetic wave, ultrasonic, laser light, etc. based on an instruction from the control apparatus 150, and outputs the energy from the power transmitting antenna 170.

The power supply apparatus 174 may be, for example, a power supply apparatus or AC (Alternating Current) adapter that is connected to a commercial power supply, a battery such as a rechargeable battery or dry battery, or a power generator. In FIG. 2, depiction of wiring used by the components in the first wireless communication apparatus 12 to receive a power supply from the power supply apparatus 174 is omitted for ease of understanding.

Figure 5:
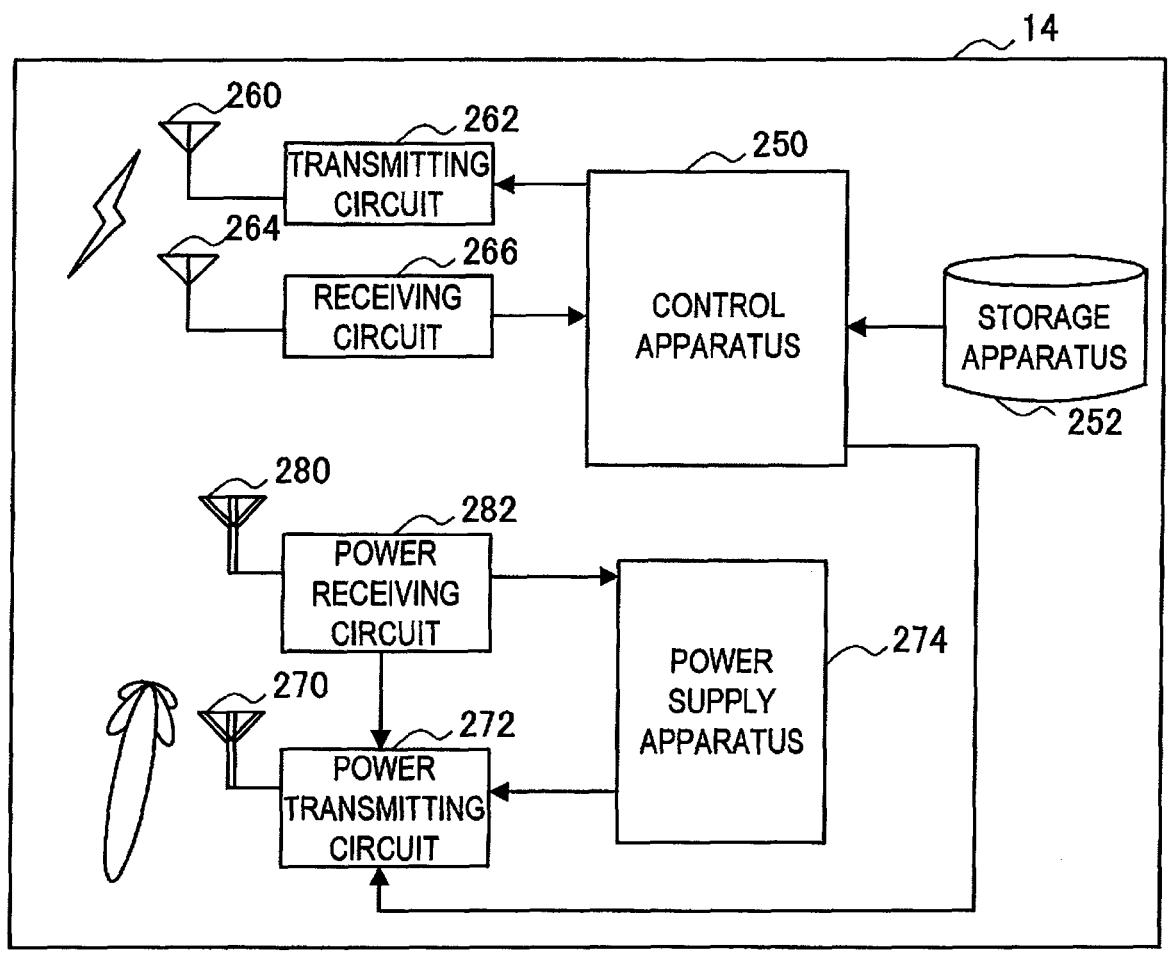
FIG. 5 is a block diagram showing an example of a hardware configuration of a second wireless communication apparatus.

FIG. 5 is a block diagram showing an example of a hardware configuration of the second wireless communication apparatus 14. Referring to FIG. 5, the second wireless communication apparatus 14 includes a control apparatus 250, a storage apparatus 252, a transmitting antenna 260, a transmitting circuit 262, a receiving antenna 264, a receiving circuit 266, a power transmitting antenna 270, a power transmitting circuit 272, a power supply apparatus 274, a power receiving antenna 280, and a power receiving circuit 282. Among these components, the control apparatus 250 and the storage apparatus 252 can be configured in the same manner as the aforementioned control apparatus 150 and storage apparatus 152 of the first wireless communication apparatus 12, except for the following points. The transmitting antenna 260, the transmitting circuit 262, the receiving antenna 264, and the receiving circuit 266 can be configured in the same manner as the aforementioned transmitting antenna 160, transmitting circuit 162, receiving antenna 164, and receiving circuit 166 of the first wireless communication apparatus 12.

The power receiving antenna 280 of the second wireless communication apparatus 14 is connected to the power receiving circuit 282 and is used for receiving a power supply from the first wireless communication apparatus 12. The power receiving circuit 282 converts energy received in the form of an electromagnetic wave, ultrasonic, laser light, etc., using the power receiving antenna 280, into power and accumulates the power in the power supply apparatus 274.

On the other hand, the power transmitting antenna 270 of the second wireless communication apparatus 14 is connected to the power transmitting circuit 272 and is used for supplying power from the second wireless communication apparatus 14. The power transmitting circuit 272 converts power received from the power supply apparatus 274 into energy such as an electromagnetic wave, ultrasonic, laser light, etc., or relays energy to be passed from the power receiving circuit 282 based on an instruction from the control apparatus 250, and outputs the energy from the power transmitting antenna 270.

Figure 6:
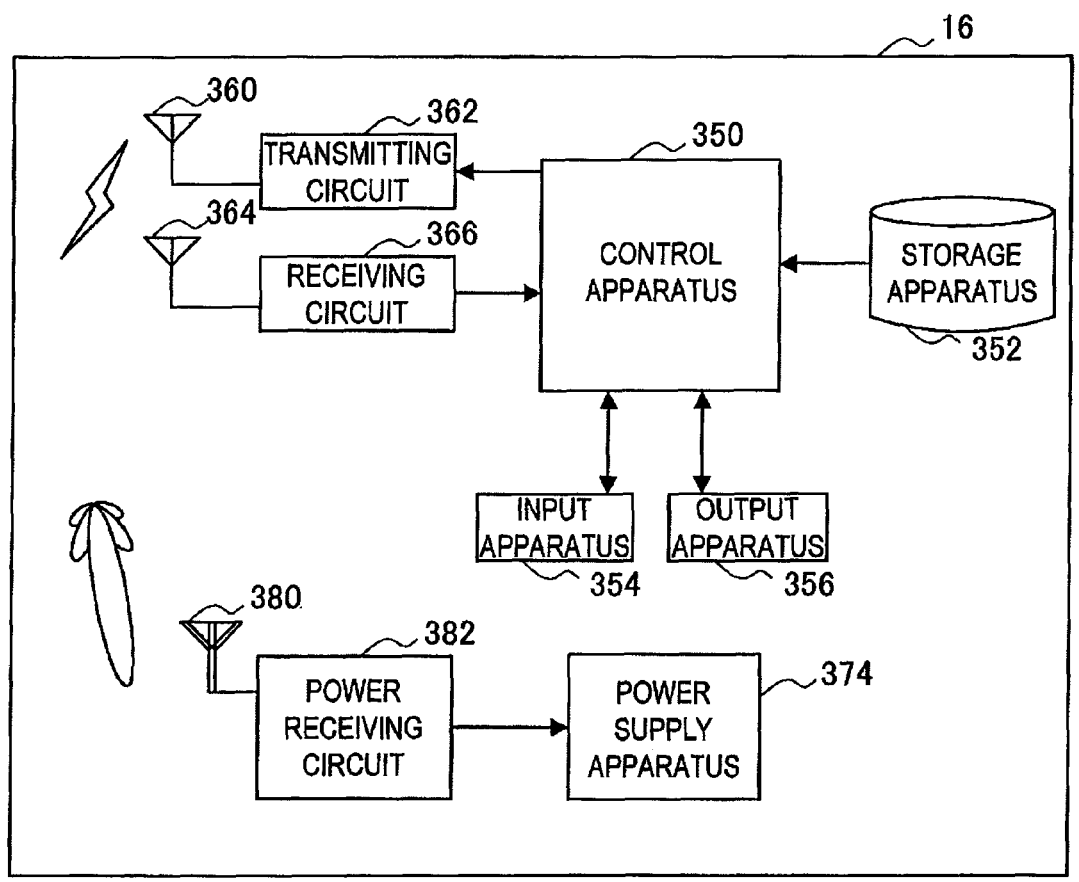
FIG. 6 is a block diagram showing an example of a hardware configuration of a power receiver apparatus.

FIG. 6 is a block diagram showing an example of a hardware configuration of the power receiver apparatus 16. Referring to FIG. 6, the power receiver apparatus 16 includes a control apparatus 350, a storage apparatus 352, an input apparatus 354, an output apparatus 356, a transmitting antenna 360, a transmitting circuit 362, a receiving antenna 364, a receiving circuit 366, a power supply apparatus 374, a power receiving antenna 380, and a power receiving circuit 382. Among these components, the control apparatus 350 and the storage apparatus 352 can be configured in the same manner as the aforementioned control apparatus 150 and storage apparatus 152 of the first wireless communication apparatus 12, except for the following points. The transmitting antenna 360, the transmitting circuit 362, the receiving antenna 364, and the receiving circuit 366 can be configured in the same manner as the aforementioned transmitting antenna 160, transmitting circuit 162, receiving antenna 164, and receiving circuit 166 of the first wireless communication apparatus 12.

The input apparatus 354 and the output apparatus 356 are connected to the control apparatus 350 of the power receiver apparatus 16. The input apparatus 354 is an apparatus for providing an instruction, etc., from a user to the power receiver apparatus 16. The input apparatus 354 may include, for example, a button, a switch, a lever, a mouse, or a keyboard, or an audio input apparatus.

The output apparatus 356 is an apparatus for presenting data to the user by means of an image, video, audio, etc. The output apparatus 356 may include, for example, a display apparatus such as a CRT (Cathode Ray Tube), a liquid crystal display, or an OLED (Organic Light Emitting Diode) or an audio output apparatus such as a speaker.

The power receiving antenna 380 of the power receiver apparatus 16 is connected to the power receiving circuit 382 and is used for receiving a power supply from the first wireless communication apparatus 12 or the second wireless communication apparatus 14. The power receiving circuit 382 converts energy received in the form of an electromagnetic wave, ultrasonic, laser light, etc., via the power receiving antenna 380, into power and accumulates the power in the power supply apparatus 374.

Note that FIGS. 2, 5, and 6 show, as an example of a configuration for supplying power to a power-receiver-side apparatus from a power-transmitter-side apparatus, a configuration using a power transmitting antenna and a power transmitting circuit and a power receiving antenna and a power receiving circuit. However, the configuration for supplying power varies in practice, depending on what form of energy the power is to be converted to. Now, four exemplary configurations for supplying power to the power-receiver-side apparatus from the power-transmitter-side apparatus will be described using FIGS. 19 to 22. Note that although, in the exemplary configurations described in FIGS. 19 to 22, the reference numerals used for the first wireless communication apparatus 12 are provided to the power transmitter side and the reference numerals used for the second wireless communication apparatus 14 are provided to the power receiver side, each exemplary configuration can also be applied to power supply from the second wireless communication apparatus 14 to the power receiver apparatus 16.

Figure 19:
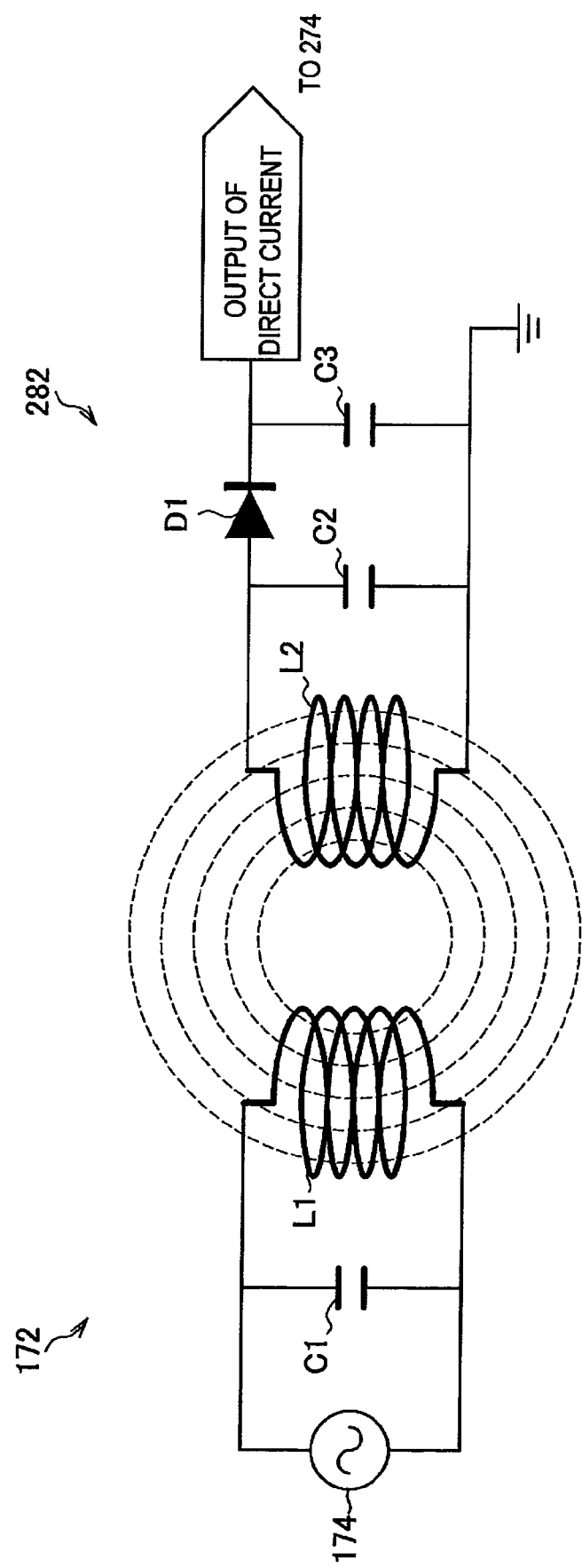
FIG. 19 is a block diagram showing a first exemplary configuration of a power transmitting circuit and a power receiving circuit.

FIG. 19 is an explanatory diagram showing configurations of a power transmitting circuit 172 and a power receiving circuit 282 that operate using an electromagnetic induction. As shown in FIG. 19, the power transmitting circuit 172 that operates using the electromagnetic induction includes a power supply apparatus 174 serving as an alternating-current power supply, a capacitor C1, and an inductor L1. The power receiving circuit 282 includes an inductor L2, a capacitor C2, a capacitor C3, and a diode D1. In such a configuration, when an alternating current is output from the power supply apparatus 174, the alternating current flows through the inductor L1, whereby magnetic flux is produced around the inductor L1. Then, the alternating current flowing through the inductor L2 by the magnetic flux is rectified by the diode D1 and the capacitor C3 and a resulting direct current is accumulated in a power supply apparatus 274. In this case, the inductor L1 and the inductor L2 respectively act as the power transmitting antenna 170 and the power receiving antenna 280.

On a power supply using the electromagnetic induction, power transmission efficiency varies depending on the locations where the power transmitter side and the power receiver side are disposed, in addition to how the inductors L1 and L2 are wound. Thus, when power is supplied from a power transmitting apparatus being in an appropriate positional relationship, power supply efficiency improves.

Figure 20:
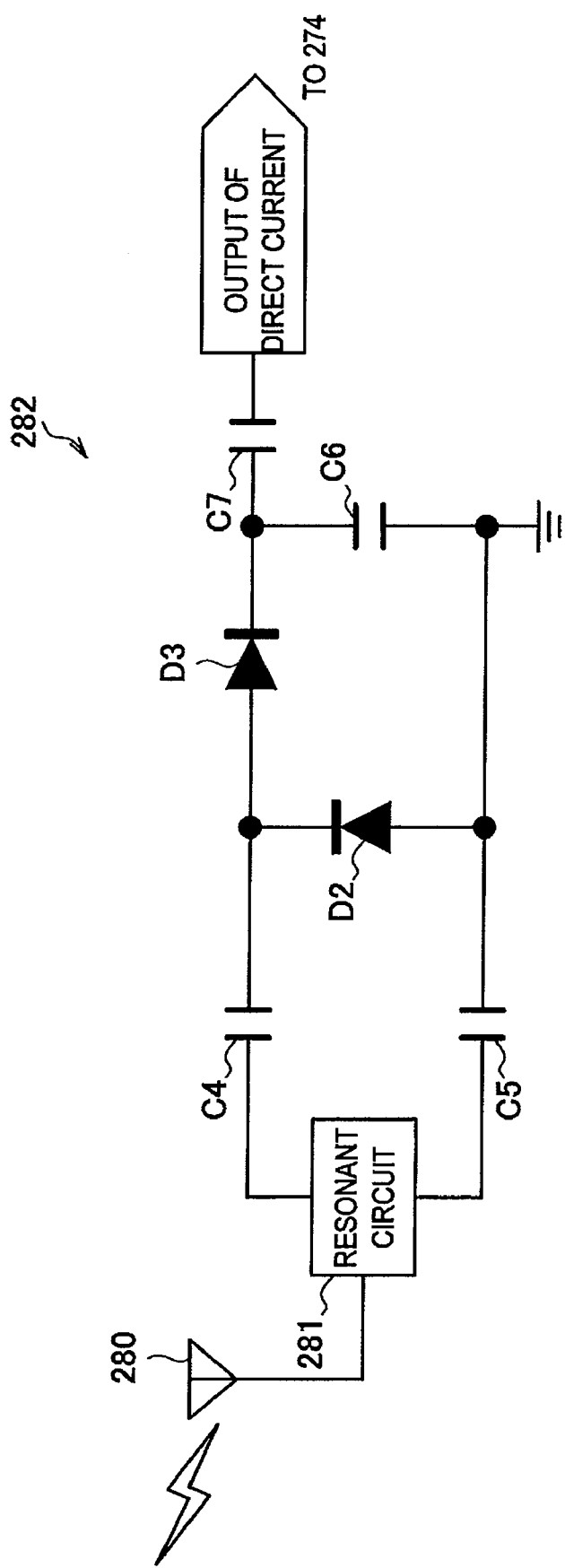
FIG. 20 is a block diagram showing a second exemplary configuration of the power transmitting circuit and the power receiving circuit.

FIG. 20 is an explanatory diagram showing a configuration of a power receiving circuit 282 that operates using a radio wave reception. As shown in FIG. 20, the power receiving circuit 282 that operates using the radio wave reception includes a power receiving antenna 280, a resonant circuit 281, a capacitor C4, a capacitor C5, a diode D2, a diode D3, a capacitor C6, and a capacitor C7. In such a configuration, when a radio wave is received by the power receiving antenna 280, an alternating current is supplied from the power receiving antenna 280 to the resonant circuit 281 and the resonant circuit 281 amplifies the alternating current by resonance. Furthermore, the amplified alternating current is rectified by a rectifier circuit including the diode D3, the capacitor C6, etc., and a resulting direct current is accumulated in a power supply apparatus 274.

On a power supply using the radio wave reception when a radio wave arriving at a power receiving apparatus is weak, sufficient power is not supplied. Hence, in the case of using radio wave reception, by supplying power from a power transmitting apparatus located closer to the power receiving apparatus than others, power supply efficiency improves.

Figure 21:
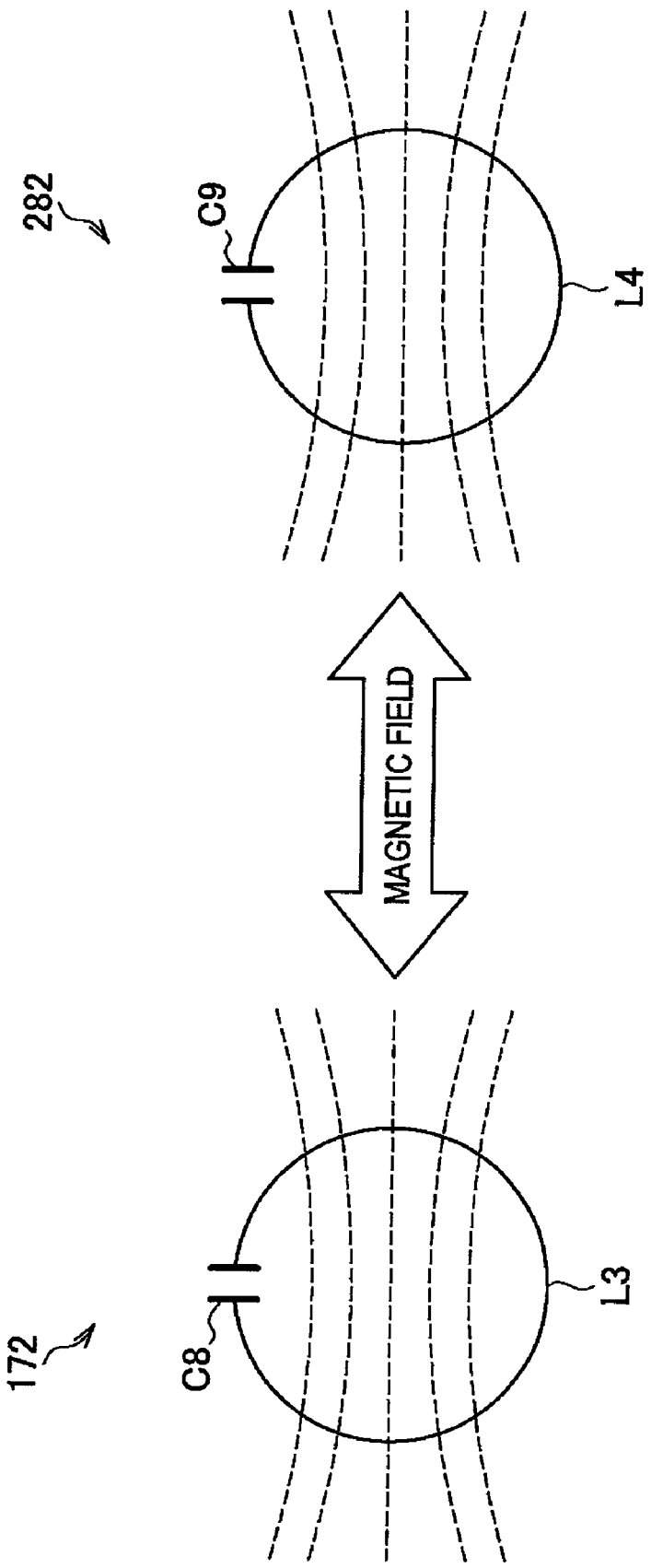
FIG. 21 is a block diagram showing a third exemplary configuration of the power transmitting circuit and the power receiving circuit.

FIG. 21 is an explanatory diagram showing configurations of a power transmitting circuit 172 and a power receiving circuit 282 that operate using a magnetic field resonance. As shown in FIG. 21, the power transmitting circuit 172 that operates using the magnetic field resonance includes a capacitor C8 and an inductor L3, and the power receiving circuit 282 includes a capacitor C9 and an inductor L4.

FIG. 22 is an explanatory diagram showing configurations of a power transmitting circuit 172 and a power receiving circuit 282 that operate in using electric field resonance. As shown in FIG. 22, the power transmitting circuit 172 and the power receiving circuit 282 that operate using the electric field resonance are configured by dielectric materials.

The above-described magnetic field resonance type and electric field resonance type use a resonance principle in which, when two resonators having one unique frequency of vibrations are arranged, vibration applied to one resonator is also transmitted to the other resonator. Such a magnetic field resonance type and an electric field resonance type have high transmission efficiency and thus can transmit power on the order of several kilowatts at a distance of several meters. Note, however, that since an antenna of a size proportional to a transmission distance may be requested, its application to generic systems may be difficult.

Examples of the hardware configurations of the first wireless communication apparatus 12, the second wireless communication apparatus 14, and the power receiver apparatus 16 according to the present embodiment have been described so far. Next, the functions of the respective apparatuses will be more specifically described.

Figure 7:
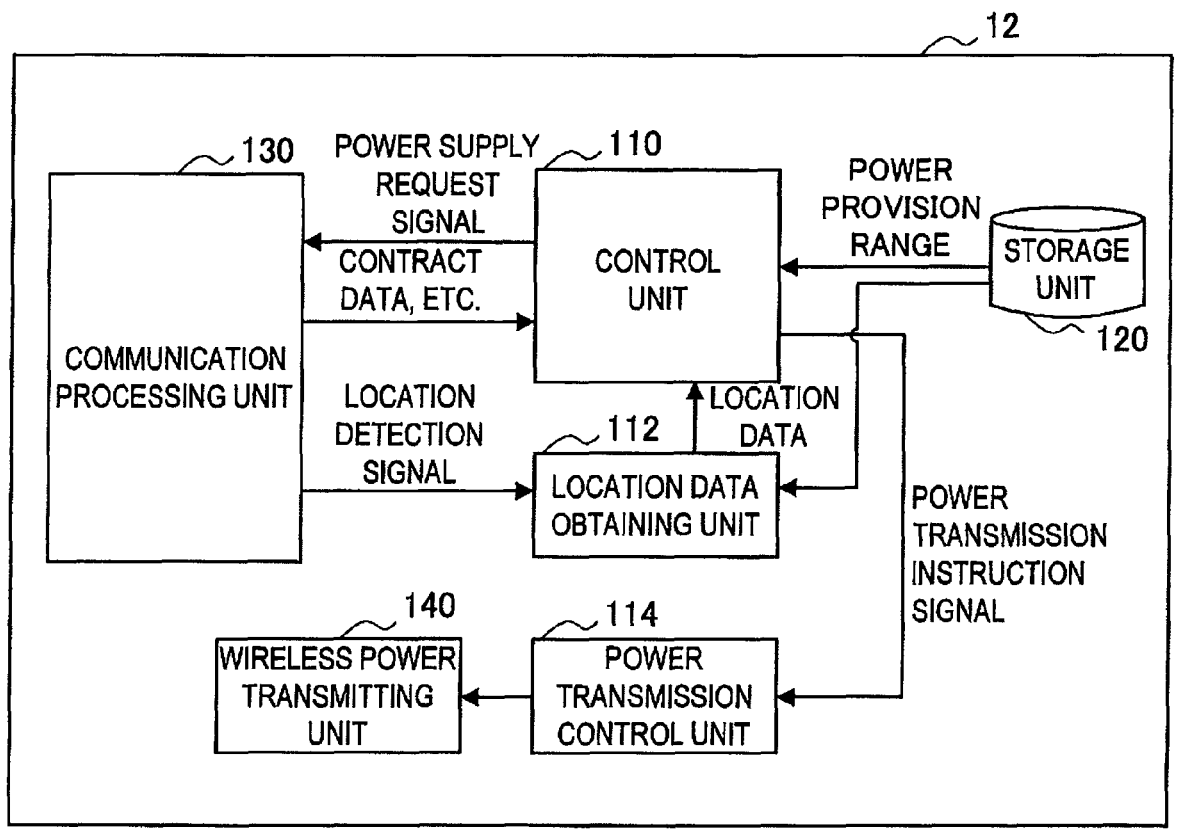
FIG. 7 is a block diagram showing an example of logical, functional arrangement of the first wireless communication apparatus.

FIG. 7 is a block diagram showing logical, functional arrangement of the first wireless communication apparatus 12 according to the present embodiment. As shown in FIG. 7, the first wireless communication apparatus 12 includes a control unit 110, a location data obtaining unit 112, a power transmission control unit 114, a storage unit 120, a communication processing unit 130, and a wireless power transmitting unit 140.

The control unit 110, the location data obtaining unit 112 and the power transmission control unit 114 are typically configured using the control apparatus 150 shown in FIG. 2.

The control unit 110 controls a power supply to the power receiver apparatus 16 in the wireless communication system 10 based on location data of the power receiver apparatus 16 which is passed from the location data obtaining unit 112. More specifically, for example, the control unit 110 compares the location data of the power receiver apparatus 16 with data on power provision ranges of the first wireless communication apparatus 12 and another wireless communication apparatus which is stored in advance in the storage unit 120, to determine whether power supply to the power receiver apparatus 16 from each apparatus can be performed.

Note that instead of storing data on a power provision range of another wireless communication apparatus in the storage unit 120 in advance, such data may be estimated at any point in time, using a location estimation method which will be described later using FIGS. 11 and 12. Note also that data on a power provision range of another wireless communication apparatus may be received and obtained from the another wireless communication apparatus through the communication processing unit 130.

If, as a result of the determination made by the control unit 110, power supply to the power receiver apparatus 16 can be performed, for example, from the second wireless communication apparatus 14, then the control unit 110 generates a power supply request signal and transmits the power supply request signal to the second wireless communication apparatus 14 through the communication processing unit 130.

Alternatively, if, as a result of the determination made by the control unit 110, power supply to the power receiver apparatus 16 can be performed from the first wireless communication apparatus 12, then the control unit 110 may further output a power transmission instruction signal to the power transmission control unit 114 to supply power from the wireless power transmitting unit 140.

The control unit 110 may determine whether to perform power supply, using one or more pieces of data including contract data, circuit data, and amount-of-remaining-power data which are transmitted from the power receiver apparatus 16.

Figure 10:
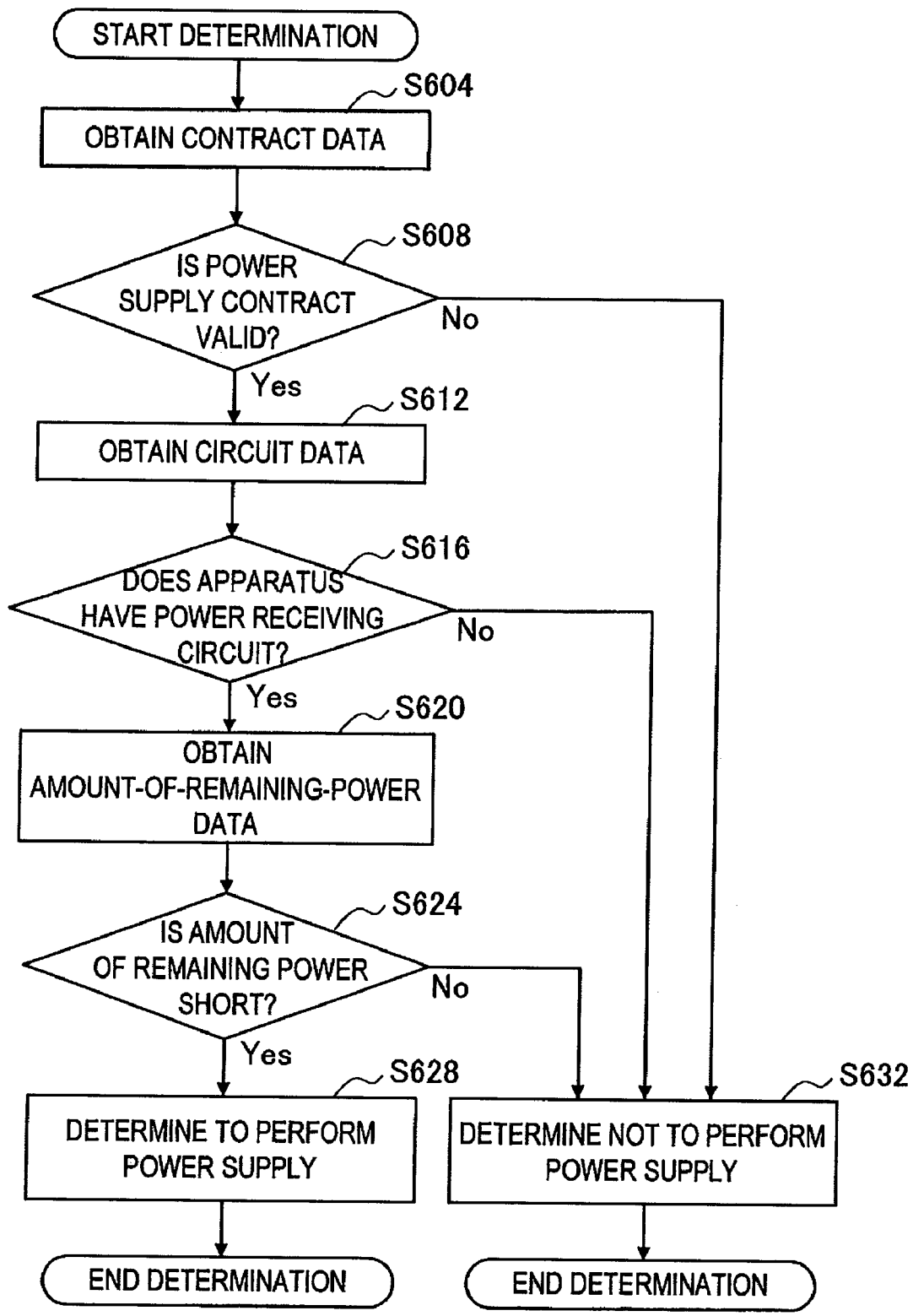
FIG. 10 is a flowchart showing the flow of a power supply determination process.

FIG. 10 is a flowchart showing, as an example, the flow of a power supply determination process in which whether to perform power supply is determined using contract data, circuit data, and amount-of-remaining-power data which are transmitted from the power receiver apparatus 16.

Referring to FIG. 10, first, contract data of the power receiver apparatus 16 is obtained (S604). The contract data of the power receiver apparatus 16 is, for example, data about a service use contract made beforehand by a user of the power receiver apparatus 16 with a power supply service provider in the wireless communication system 10. The contract data of the power receiver apparatus 16 may include data indicating, for example, a service use period or an amount of power to be provided. Such contract data is stored in advance (at the time of making a contract) in, for example, a storage unit 320 of the power receiver apparatus 16 which will be described later. Then, the control unit 110 of the first wireless communication apparatus 12 obtains the contract data transmitted from the power receiver apparatus 16 upon power supply.

Thereafter, the control unit 110 determines whether content of the obtained contract data is valid (S608). For example, when the transmitted contract data indicates that it is not valid because the service use period has expired, the control unit 110 determines not to perform power supply (S632) and ends the process.

If, at S608, content of the contract data is valid, then circuit data of the power receiver apparatus 16 is obtained (S612). The circuit data of the power receiver apparatus 16 is data indicating whether the power receiver apparatus 16 has a power receiving circuit. The circuit data is stored in advance in, for example, the storage unit 320 of the power receiver apparatus 16. The control unit 110 of the first wireless communication apparatus 12 then obtains the circuit data transmitted from the power receiver apparatus 16 upon power supply.

Thereafter, the control unit 110 determines based on the obtained circuit data of the power receiver apparatus 16 whether the power receiver apparatus 16 has a power receiving circuit (S616). If the control unit 110 determines that the power receiver apparatus 16 does not have a power receiving circuit, then the control unit 110 determines not to perform power supply (S632) and ends the process.

If it is determined at S616 that the power receiver apparatus 16 has a power receiving circuit, then amount-of-remaining-power data of the power receiver apparatus 16 is obtained (S620). The amount-of-remaining-power data is, for example, data to be output from a wireless power receiving unit 342 to a control unit 310 of the power receiver apparatus 16 which will be described later. The amount-of-remaining-power data can be represented by, for example, a percentage of the power supply capacity of the power receiver apparatus 16. The control unit of the first wireless communication apparatus 12 obtains the amount-of-remaining-power data transmitted from the power receiver apparatus 16 upon power supply.

Thereafter, the control unit 110 determines based on the obtained amount-of-remaining-power data of the power receiver apparatus 16 whether the amount of remaining power of the power receiver apparatus 16 is short, by, for example, making a comparison with a predetermined threshold value (S624). If the control unit 110 determines that the amount of remaining power of the power receiver apparatus 16 is not short, then the control unit 110 determines not to perform power supply (S632) and ends the process. On the other hand, if the control unit 110 determines that the amount of remaining power of the power receiver apparatus 16 is short, then the control unit 110 determines to perform power supply (S628) and ends the process.

Note that the order of the process shown in FIG. 10 is not limited to that shown in the example and the process may be performed in any order.

Returning to FIG. 7, the description of the functional blocks of the first wireless communication apparatus 12 is continued. In the present embodiment, the location data obtaining unit 112 of the first wireless communication apparatus 12 estimates a location of the power receiver apparatus 16 using a signal received through the communication processing unit 130 and outputs location data to the control unit 110.

Location estimation by the location data obtaining unit of the first wireless communication apparatus 12 can be performed by, for example, a distance measuring method using a correlator or an arrival direction estimation method as represented by a MUSIC (MUltiple SIgnal Classification) algorithm. Alternatively, the first wireless communication apparatus 12 and another wireless communication apparatus (e.g., the second wireless communication apparatus 14) may cooperate with each other to estimate a location of the power receiver apparatus 16 by a three-point positioning method.

Figure 11:
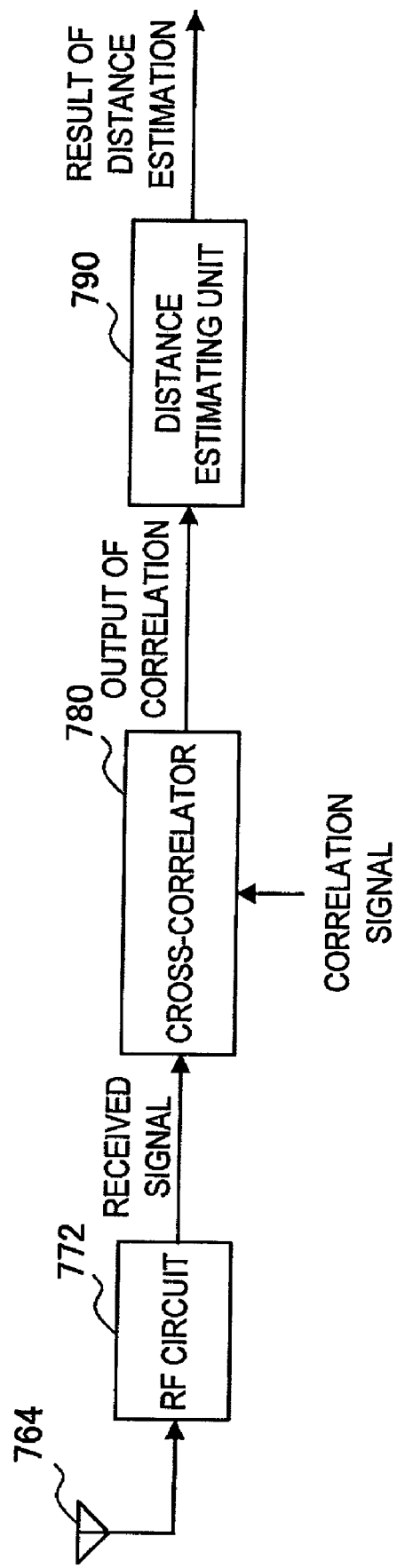
FIG. 11 is a block diagram showing a first exemplary configuration of a location data obtaining unit.

FIG. 11 is a diagram showing a first exemplary configuration of the location data obtaining unit 112, in which a location is estimated by a distance measuring method using a correlator. Referring to FIG. 11, the location data obtaining unit 112 has a receiving antenna 764, an RF (Radio Frequency) circuit 772, a cross-correlator 780, and a distance estimating unit 790. The location data obtaining unit 112 may use the receiving antenna 164 and the RF circuit 72 shown in FIGS. 2 and 4 respectively as the receiving antenna 764 and the RF circuit 772.

In the first exemplary configuration of the location data obtaining unit 112, a known radio signal transmitted from the power receiver apparatus 16 is received by the receiving antenna 764. Thereafter, a cross-correlation between a received signal output from the RF circuit 772 and a correlation signal held beforehand in the circuit is calculated by the cross-correlator 780. Then, the distance estimating unit 790 can estimate a distance between the first wireless communication apparatus 12 and the power receiver apparatus 16, using a time difference from a predetermined reference time until when a correlation peak of an output signal from the cross-correlator 780 is detected.

Figure 12:
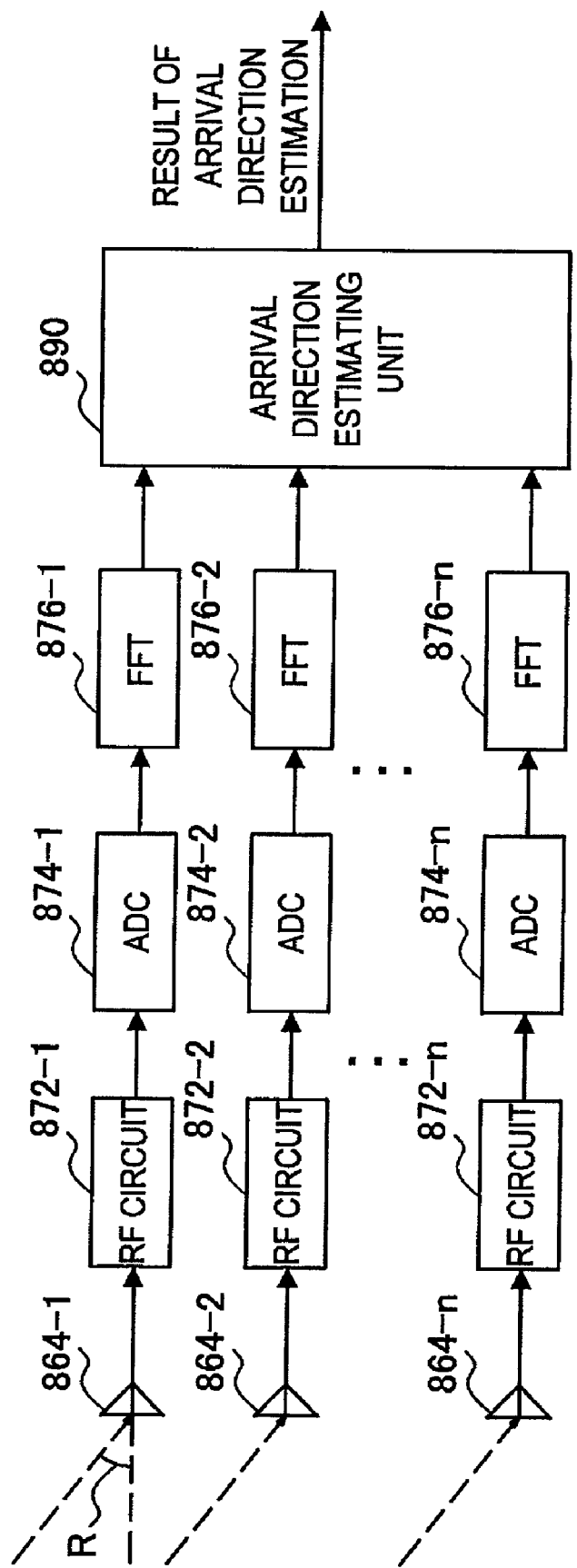
FIG. 12 is a block diagram showing a second exemplary configuration of the location data obtaining unit.

FIG. 12 is a diagram showing a second exemplary configuration of the location data obtaining unit 112, in which a location is estimated using an arrival direction estimation method. Referring to FIG. 12, the location data obtaining unit 112 has n branches in parallel, each including a receiving antenna 864-$i$, an RF circuit 872-$i$, an ADC 874-$i$, and an FFT 876-$i$ which are connected to each other in series ($1 \leq i \leq n$). Each of the n branches is connected to an arrival direction estimating unit 890.

The arrival direction estimating unit 890 estimates an arrival direction (e.g., an angle R shown in FIG. 12) of a radio signal from the power receiver apparatus 16, using a phase difference and an amplitude difference between signals received by the respective branches. For an arrival direction estimation algorithm by the arrival direction estimating unit 890, the MUSIC algorithm which is commonly used by adaptive array antennas, or the like, can be used.

Note that the location data obtaining unit 112 may use a combination of the first exemplary configuration described using FIG. 11 and the second exemplary configuration described using FIG. 12. By doing so, the location data obtaining unit 112 can estimate a detailed location of the power receiver apparatus 16, using the estimated distance and direction of the power receiver apparatus 16.

Returning to FIG. 7 again, the description of the functional blocks of the first wireless communication apparatus 12 is continued.

The communication processing unit 130 transmits a radio signal using the transmitting antenna 160 and the transmitting circuit 162 shown in FIG. 2, and receives a radio signal using the receiving antenna 164 and the receiving circuit 166. In the present embodiment, for example, a power supply request signal which will be described later is transmitted from the first wireless communication apparatus 12 to the second wireless communication apparatus 14 through the communication processing unit 130. Further, contract data, circuit data, amount-of-remaining-power data, etc., of the power receiver apparatus 16 may be received from the power receiver apparatus 16 through the communication processing unit 130.

When the power transmission control unit 114 receives a power transmission instruction signal from the control unit 110, the power transmission control unit 114 starts or stops power supply from the wireless power transmitting unit 140.

The storage unit 120 is a storage area for storing data or programs, which is configured by the storage apparatus 152 shown in FIG. 2, the ROM 54 shown in FIG. 3, or the like. In the storage unit 120, for example, the aforementioned data on power supplyable ranges of the first wireless communication apparatus 12 and another wireless communication apparatus is stored.

The wireless power transmitting unit 140 supplies power received from the power supply apparatus 174, to the second wireless communication apparatus 14 or the power receiver apparatus 16, using the power transmitting antenna 170 and the power transmitting circuit 172 shown in FIG. 2. Power supply from the wireless power transmitting unit 140 is performed in response to control by the power transmission control unit 114.

Figure 8:
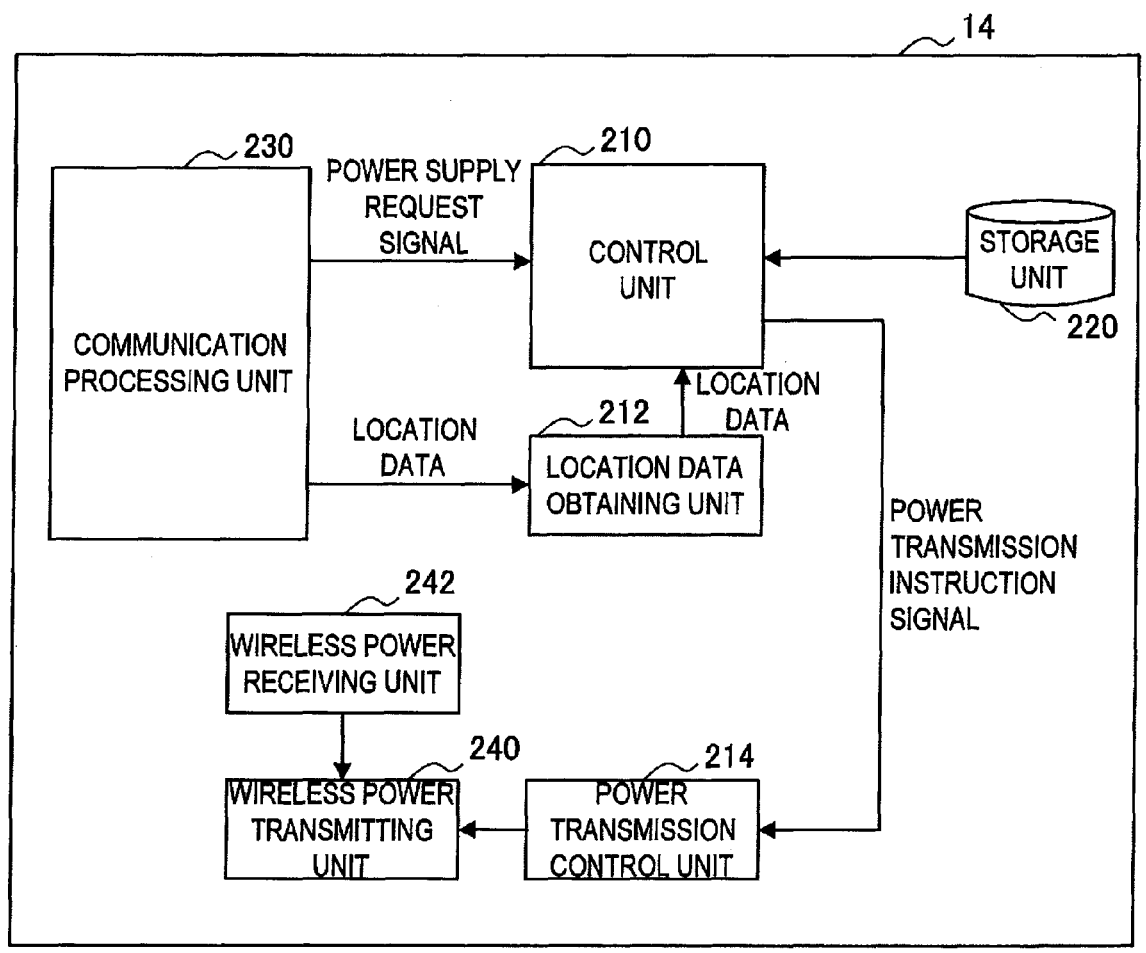
FIG. 8 is a block diagram showing an example of logical, functional arrangement of the second wireless communication apparatus.

FIG. 8 is a block diagram showing logical, functional arrangement of the second wireless communication apparatus 14 according to the present embodiment. As shown in FIG. 8, the second wireless communication apparatus 14 includes a control unit 210, a location data obtaining unit 212, a power transmission control unit 214, a storage unit 220, a communication processing unit 230, a wireless power transmitting unit 240, and a wireless power receiving unit 242.

The control unit 210, the location data obtaining unit 212, and the power transmission control unit 214 are typically configured using the control apparatus 250 shown in FIG. 5.

After the control unit 210 received a power supply request signal from the first wireless communication apparatus 12 through the communication processing unit 230, the control unit 210 outputs a power transmission instruction signal to the power transmission control unit 214 based on location data to be passed from the location data obtaining unit 212. The power supply request signal includes, for example, an identifier representing an apparatus serving as a power supply destination. In the present embodiment, the power receiver apparatus 16 corresponds to the apparatus serving as a power supply destination. For the identifier representing the power receiver apparatus 16, for example, a MAC address, an IP address, a host name, etc., of the power receiver apparatus 16 can be used.

Further, the power supply request signal may include the contract data, circuit data, or amount-of-remaining-power data of the power receiver apparatus 16 which is described using FIG. 10, and the control unit 210 of the second wireless communication apparatus 14 may perform a power supply determination process. Instead of that, the control unit 210 of the second wireless communication apparatus 14 may directly receive contract data, circuit data, or amount-of-remaining-power data from the power receiver apparatus 16 through the communication processing unit 230 and perform a power supply determination process.

Further, the power supply request signal may include location data of the power receiver apparatus 16 obtained by the first wireless communication apparatus 12. Furthermore, the power supply request signal may include a bit value indicating the start or end of power supply and when the amount of remaining power of the power receiver apparatus 16 is sufficiently recovered, the first wireless communication apparatus 12 may instruct the second wireless communication apparatus 14 to end the power supply.

The location data obtaining unit 212 of the second wireless communication apparatus 14 obtains, for example, location data of the power receiver apparatus 16 which is transmitted from the first wireless communication apparatus 12 and received through the communication processing unit 230. The location data of the power receiver apparatus 16 may be transmitted from the first wireless communication apparatus 12 separately from the aforementioned power supply request signal or may be transmitted as part of the power supply request signal. The location data obtaining unit 212 outputs the obtained location data to the control unit 210.

The storage unit 220 and the communication processing unit 230 of the second wireless communication apparatus 14 have the same functions as the storage unit 120 and the communication processing unit 130 of the first wireless communication apparatus 12 described using FIG. 7.

After the power transmission control unit 214 received a power transmission instruction signal from the control unit 210, the power transmission control unit 214 starts or stops power supply from the wireless power transmitting unit 240.

The wireless power transmitting unit 240 supplies power to the power receiver apparatus 16 using the power transmitting antenna 270 and the power transmitting circuit 272 shown in FIG. 5. The wireless power transmitting unit 240 may supply power to the power receiver apparatus 16 by converting power received from the power supply apparatus 274 into energy. Alternatively, the wireless power transmitting unit 240 may supply power to the power receiver apparatus 16 by relaying energy as it is that is received by the wireless power receiving unit 242 from the first wireless communication apparatus 12. Power supply from the wireless power transmitting unit 240 is performed in response to control by the power transmission control unit 214.

The wireless power transmitting unit 242 converts energy received from the first wireless communication apparatus 12 using the power receiving antenna 280 and the power receiving circuit 282 shown in FIG. 5 into power and accumulates the power in the power supply apparatus 274 or relays the power to the wireless power transmitting unit 240.

Figure 9:
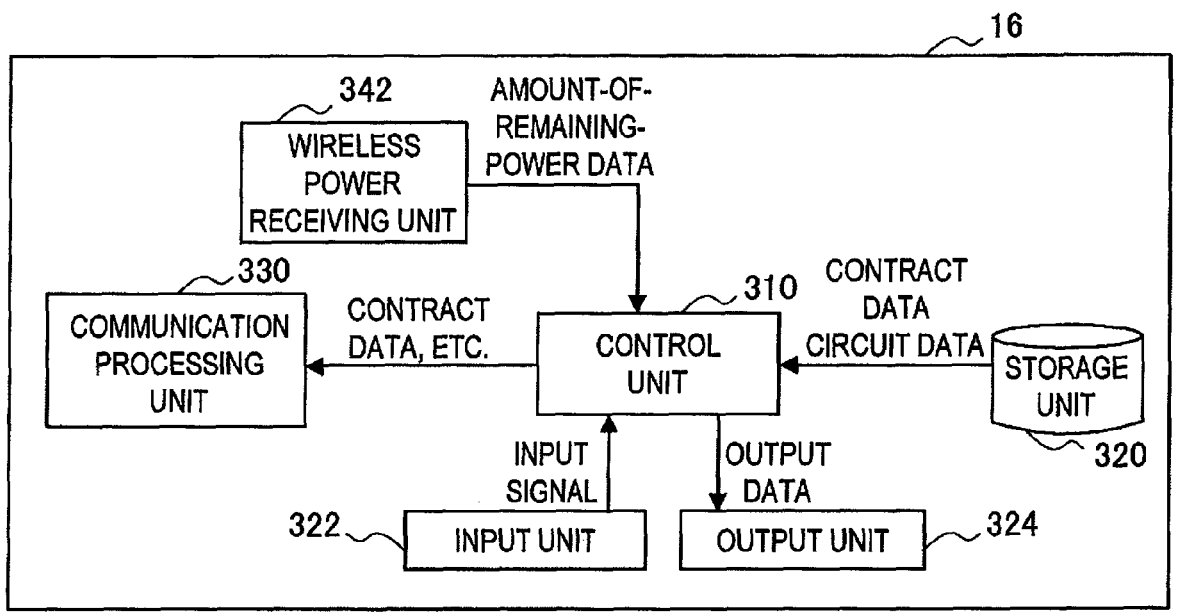
FIG. 9 is a block diagram showing an example of logical, functional arrangement of the power receiver apparatus.

FIG. 9 is a block diagram showing logical, functional arrangement of the power receiver apparatus 16 according to the present embodiment. As shown in FIG. 9, the power receiver apparatus 16 includes a control unit 310, a storage unit 320, an input unit 322, an output unit 324, a communication processing unit 330, and a wireless power receiving unit 342.

The control unit 310 is typically configured using the control apparatus 350 shown in FIG. 6 and controls overall operations of the power receiver apparatus 16.

The input unit 322, for example, when a user operates the input apparatus 354 shown in FIG. 6, converts the operation into an input signal and transmits the input signal to the control unit 310. The output unit 324, for example, displays or outputs as audio on the output apparatus 356 shown in FIG. 6 output data such as a power reception status to be passed from the control unit 310.

The storage unit 320 is a storage area for storing data or programs, which is configured by the storage apparatus 352 shown in FIG. 6, a ROM in the control apparatus 350, or the like. The storage unit 320 stores, as described above, contract data, circuit data, etc., of the power receiver apparatus 16.

The function of the communication processing unit 330 is the same as the function of the aforementioned communication processing unit 130 of the first wireless communication apparatus 12.

The wireless power receiving unit 342 converts energy supplied from, for example, the second wireless communication apparatus 14 using the power receiving antenna 380 and the power receiving circuit 382 shown in FIG. 6 into power and accumulates the power in the power supply apparatus 374. Further, the wireless power receiving unit 342 detects an amount of remaining power of the power supply apparatus 374 and outputs amount-of-remaining-power data to the control unit 310.

The logical, functional arrangement of the first wireless communication apparatus 12, the second wireless communication apparatus 14, and the power receiver apparatus 16 according to the present embodiment has been described so far using FIGS. 7 to 9. Next, the flow of a power supply process according to the present embodiment will be described using FIGS. 13 and 14.

Figure 13:
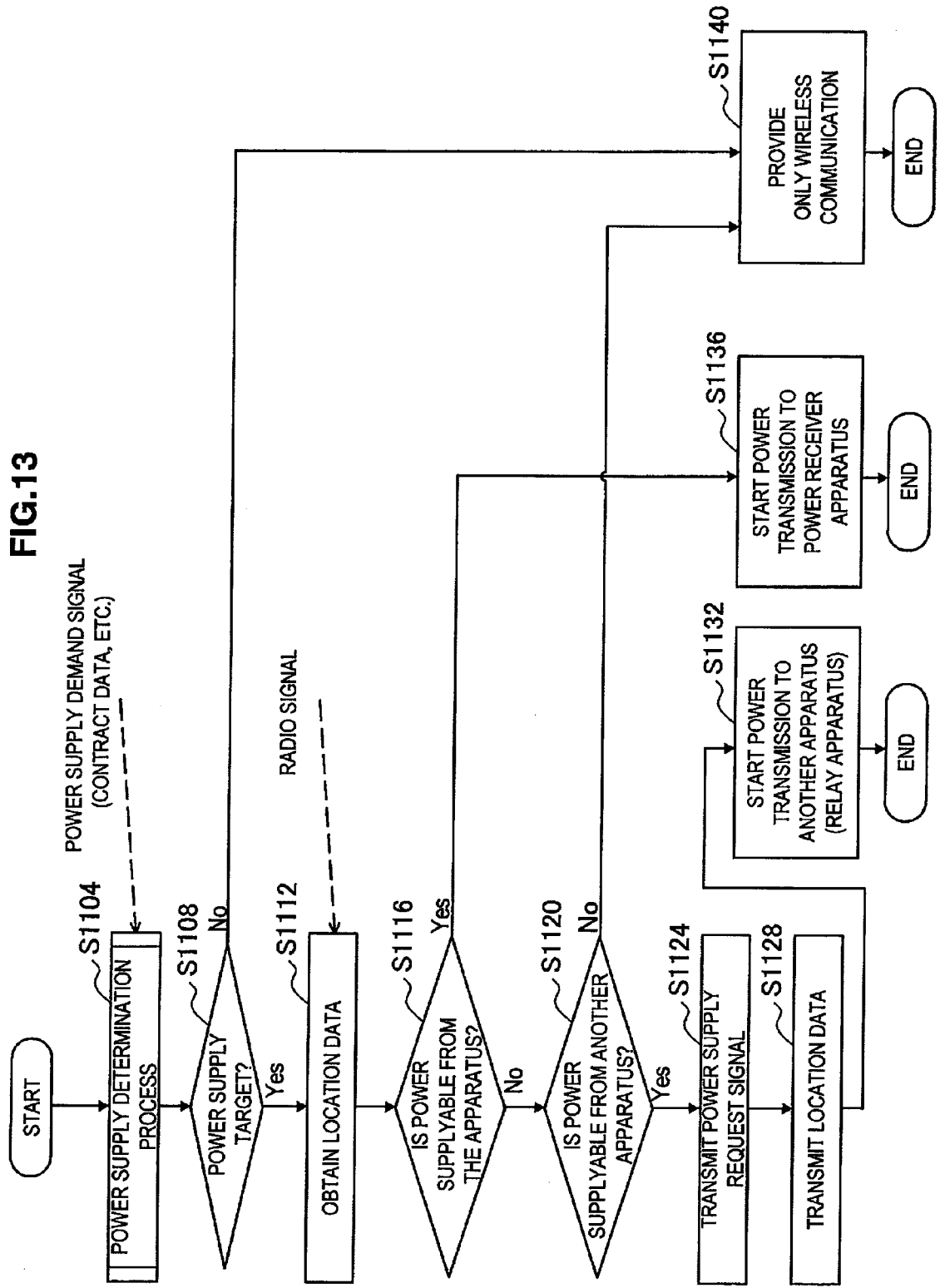
FIG. 13 is a flowchart showing the flow of a process performed by the first wireless communication apparatus according to the first embodiment.

FIG. 13 is a flowchart showing, as an example, the flow of a power supply process performed by the first wireless communication apparatus 12 according to the present embodiment.

Referring to FIG. 13, first, a power supply determination process (the process described using FIG. 10) by the control unit 110 is performed (S1104). The power supply determination process by the control unit 110 can be triggered when, for example, a user of the power receiver apparatus 16 operates the input unit 322, whereby a signal demanding power supply is transmitted to the first wireless communication apparatus 12. In such a case, the signal demanding power supply may include contract data, circuit data, or amount-of-remaining-power data of the power receiver apparatus 16 which is used in the power supply determination process. Alternatively, instead of the user's operation, the power receiver apparatus 16 may periodically send out a signal demanding power supply, to apparatuses therearound. After S1104, the process branches off according to a result of the power supply determination process (S1108).

If at S1108 it is determined, as a result of the power supply determination process, not to perform power supply, then power supply to the power receiver apparatus 16 is not performed and only wireless communication with the first wireless communication apparatus 12 is provided (S1140).

On the other hand, if at S1108 it is determined to perform power supply to the power receiver apparatus 16, then the location data obtaining unit 112 estimates a location of the power receiver apparatus 16 using a radio signal received from the power receiver apparatus 16, and thereby obtains location data. The location data of the power receiver apparatus 16 obtained here is passed to the control unit 110 (S1112). For the location data in the present embodiment, for example, a distance estimation result obtained in the first exemplary configuration of the location data obtaining unit 112 shown in FIG. 11, an arrival direction estimation result obtained in the second exemplary configuration of the location data obtaining unit 112 shown in FIG. 12, a combination thereof, or the like, can be used.

The control unit 110 then compares the location data passed from the location data obtaining unit 112 with data on a power supplyable range stored in advance in the storage unit 120, to determine whether the power receiver apparatus 16 is located within a power supplyable range from the first wireless communication apparatus 12 (S1116).

Herein, if, for example, the power receiver apparatus 16 is located within the area 12b shown in FIG. 1, then it is determined that the power receiver apparatus 16 is located within a power supplyable range from the first wireless communication apparatus 12. In such a case, the control unit 110 then outputs a power transmission instruction signal to the power transmission control unit 114, whereby power transmission from the wireless power transmitting unit 140 to the power receiver apparatus 16 starts (S1136).

On the other hand, if the power receiver apparatus 16 is located outside the area 12b shown in FIG. 1, then it is determined that the power receiver apparatus 16 is not located within a power supplyable range from the first wireless communication apparatus 12. In such a case, the control unit 110 further determines whether there is another apparatus that can supply power to the power receiver apparatus 16 (S1120).

The determination at S1120 may be performed such that, for example, the location data obtaining unit 112 obtains location data of another wireless communication apparatus stored in advance in the storage unit 120 and the control unit 110 compares the obtained location data with the location data of the power receiver apparatus 16. Instead of that, the location data obtaining unit 112 may estimate a location of another wireless communication apparatus by the techniques described using FIGS. 11 and 12 and the control unit 110 may receive estimated location data of the another wireless communication apparatus from the location data obtaining unit 112 and use the estimated location data for the above-described comparison.

If it is determined at S1120 that there is no another apparatus that can supply power to the power receiver apparatus 16, then power supply to the power receiver apparatus 16 is not performed and only wireless communication with the first wireless communication apparatus 12 is provided (S1140).

On the other hand, if, for example, the second wireless communication apparatus 14 is located between the first wireless communication apparatus 12 and the power receiver apparatus 16, as shown in FIG. 1, then it is determined at S1120 that power supply can be performed from the second wireless communication apparatus 14 to the power receiver apparatus 16. In such a case, the control unit 110 of the first wireless communication apparatus 12 transmits the aforementioned power supply request signal to the second wireless communication apparatus 14 through the communication processing unit 130 (S1124).

Furthermore, the control unit 110 of the first wireless communication apparatus 12 transmits the location data of the power receiver apparatus 16 to the second wireless communication apparatus 14 through the communication processing unit 130 (S1128). Note that when the second wireless communication apparatus 14 also has a location estimation function, as described above, a location data transmission process from the first wireless communication apparatus 12 to the second wireless communication apparatus 14 may be omitted. Further, at S1124, the location data of the power receiver apparatus 16 may be transmitted as part of the power supply request signal.

Thereafter, the control unit 110 of the first wireless communication apparatus 12 outputs a power transmission instruction signal to the power transmission control unit 114, whereby power supply from the wireless power transmitting unit 140 to the second wireless communication apparatus 14 starts (S1132).

Figure 14:
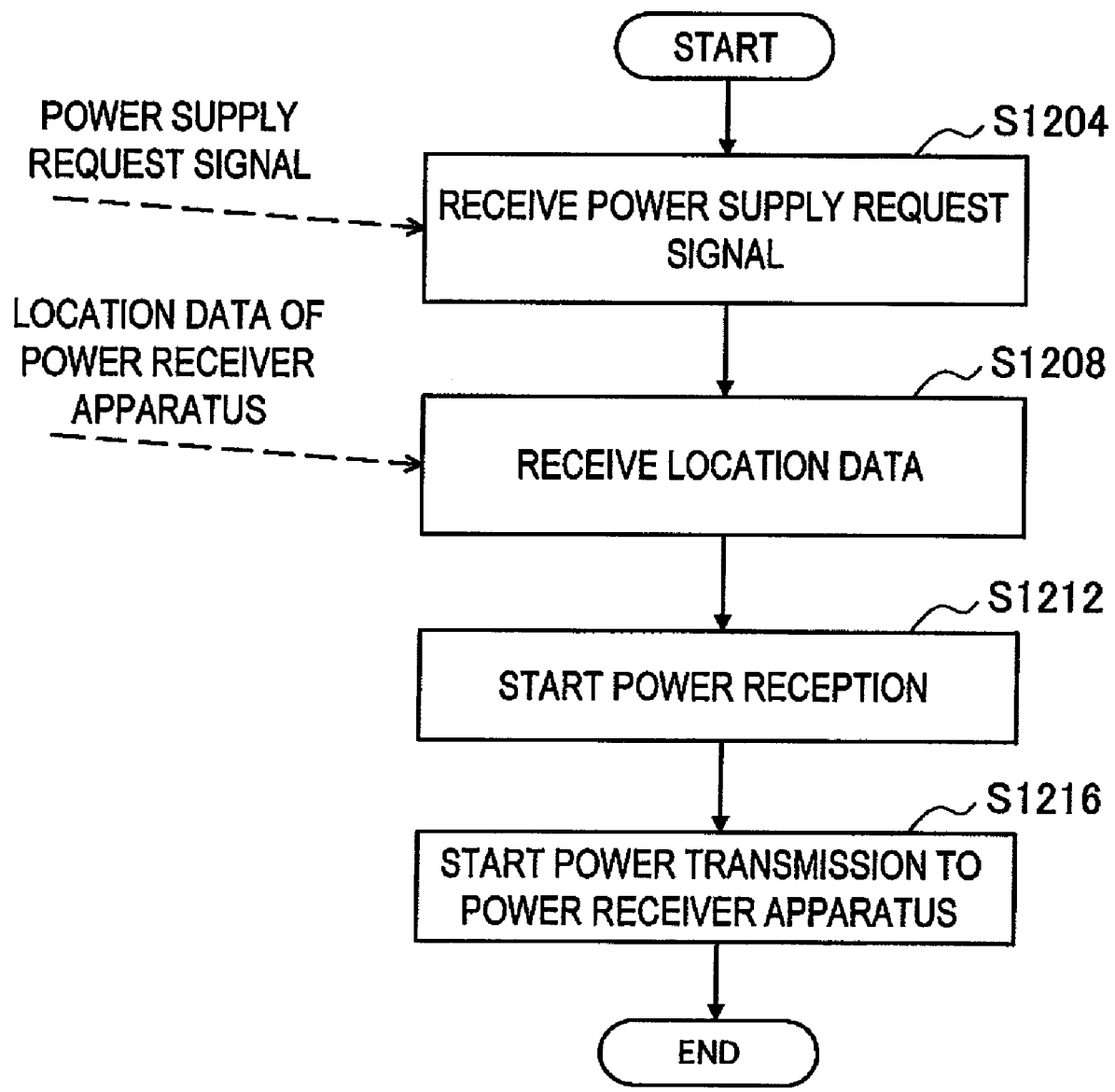
FIG. 14 is a flowchart showing the flow of a process performed by the second wireless communication apparatus according to the first embodiment.

FIG. 14 is a flowchart showing the flow of a power supply process performed by the second wireless communication apparatus 14 during the process described using FIG. 13, in which the second wireless communication apparatus 14 receives a power transmission request signal transmitted from the first wireless communication apparatus 12 and performs power supply to the power receiver apparatus 16.

Referring to FIG. 14, first, the communication processing unit 230 of the second wireless communication apparatus 14 receives a power supply request signal (S1204). The control unit 210 recognizes that the power supply target is the power receiver apparatus 16 based on, for example, an identifier included in the power supply request signal. Then, the communication processing unit 230 further receives location data of the power receiver apparatus 16 transmitted from the first wireless communication apparatus 12. The location data is obtained by the location data obtaining unit 212 and passed to the control unit 210 (S1208).

Furthermore, power supply from the first wireless communication apparatus 12 to the second wireless communication apparatus 14 starts (S1212). Then, the control unit 210 of the second wireless communication apparatus 14 outputs a power transmission instruction signal to the power transmission control unit 214, to start power supply from the wireless power transmitting unit 240 to the power receiver apparatus 16 (S1216).

Here, for example, the second wireless communication apparatus 14 may orient the directivity of the power transmitting antenna to a power supply destination apparatus specified by the power supply request signal (which, in this example, corresponds to the power receiver apparatus 16) so that power is supplied only to the apparatus to which the directivity is oriented. By doing so, when, for example, there are an apparatus whose contract is confirmed to be valid and an apparatus whose contract can be hardly confirmed to be valid in a power supplyable range from the second wireless communication apparatus 14, power can be supplied only to the apparatus whose contract is confirmed to be valid.

The flow of a power supply process to the power receiver apparatus 16 according to the first embodiment has been described so far using FIGS. 13 and 14.

In the present embodiment, the location data obtaining unit 112 of the first wireless communication apparatus 12 obtains location data of the power receiver apparatus 16. Then, using the location data of the power receiver apparatus 16 output from the location data obtaining unit 112, the control unit 110 determines whether the power receiver apparatus 16 is located within a power supplyable range from the first wireless communication apparatus 12 and another wireless communication apparatus. Herein, when, for example, it is determined that the power receiver apparatus 16 is located within a power supplyable range from the second wireless communication apparatus 14, a power supply request signal requesting a power supply for the power receiver apparatus 16 is transmitted to the second wireless communication apparatus 14. Then, when the second wireless communication apparatus 14 receives the power supply request signal from the first wireless communication apparatus 12, the second wireless communication apparatus 14 lets the wireless power transmitting unit 240 supply power to the power receiver apparatus 16.

According to this configuration, even when the power receiver apparatus 16 is located outside the power supplyable range from the first wireless communication apparatus 12, if the second wireless communication apparatus 14 is located near the power receiver apparatus 16, then power can be supplied to the power receiver apparatus 16 from the second wireless communication apparatus 14.

Further, in the present embodiment, the control unit 110 of the first wireless communication apparatus 12 transmits location data obtained by the location data obtaining unit 112 to the second wireless communication apparatus 14. According to this configuration, without the second wireless communication apparatus 14 itself estimating a location of the power receiver apparatus 16, the location data of the power receiver apparatus 16 which is already obtained by the first wireless communication apparatus 12 can be shared.

Further, in the present embodiment, when the second wireless communication apparatus 14 is within the power supplyable range from the first wireless communication apparatus 12, the control unit 110 lets the wireless power transmitting unit 140 supply power to the wireless power receiving unit 242 of the second wireless communication apparatus 14. Herein, the control unit 210 of the second wireless communication apparatus 14 lets the wireless power receiving unit 242 receive the power supply from the first wireless communication apparatus 12 and lets the wireless power transmitting unit 240 supply power to the power receiver apparatus 16.

According to this configuration, even when, for example, sufficient power supply capacity does not remain in the second wireless communication apparatus 14, the second wireless communication apparatus 14 can relay and supply power held by the first wireless communication apparatus 12 to the power receiver apparatus 16.

Note that part or all of the functions of the first wireless communication apparatus 12, the second wireless communication apparatus 14, and the power receiver apparatus 16 according to the first embodiment may be implemented as a computer program. For example, when the functions of the first wireless communication apparatus 12 are implemented as a computer program, the program is, for example, stored in the storage unit 120 and loaded into the RAM 52 and then executed by the CPU 50.

Next, a second embodiment of the present invention will be described using FIGS. 15 to 18.

[2] Second Embodiment

Figure 15:
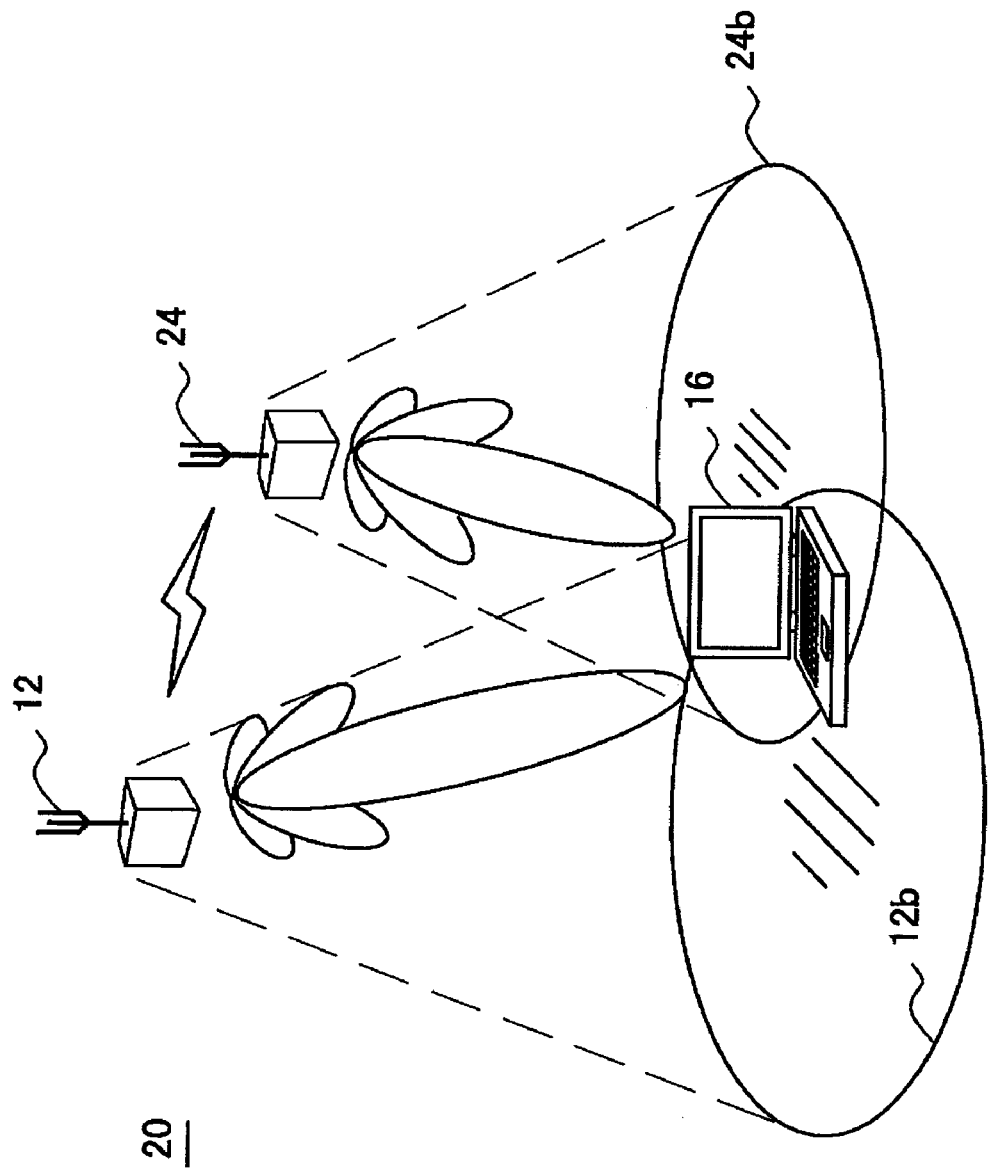
FIG. 15 is an explanatory diagram showing an overview of a wireless communication system according to a second embodiment.

FIG. 15 is an explanatory diagram showing a configuration of a wireless communication system 20 according to the second embodiment of the present invention. The wireless communication system 20 shown in FIG. 15 includes a first wireless communication apparatus 12, a second wireless communication apparatus 24, and a power receiver apparatus 16.

Although in FIG. 15 a wireless access point is shown as the second wireless communication apparatus 24, the second wireless communication apparatus 24 is not limited to a wireless access point. The second wireless communication apparatus 24 may be, for example, a network apparatus, a data processing apparatus, or a household appliance which is exemplified in connection with the first wireless communication apparatus 12 in the description of FIG. 1.

Referring to FIG. 15, in addition to an area 12b around the first wireless communication apparatus 12, an area 24b is shown around the second wireless communication apparatus 24. The area 24b represents a range in which power can be wirelessly supplied from the second wireless communication apparatus 24. That is, power can be supplied to the power receiver apparatus 16 located within the areas 12b and 24b, from the first wireless communication apparatus 12 and the second wireless communication apparatus 24.

Under such circumstances, in the present embodiment, the first wireless communication apparatus 12 recognizes a location of the power receiver apparatus 16 and power supply is performed parallel to the power receiver apparatus 16 from the second wireless communication apparatus 24 located near the power receiver apparatus 16 and the first wireless communication apparatus 12.

The second wireless communication apparatus 24 can be configured in the same manner as the hardware configuration of the first wireless communication apparatus 12 described using FIG. 2. That is, in the present embodiment, the second wireless communication apparatus 24 may not need to include a receiving antenna and a receiving circuit.

Figure 16:
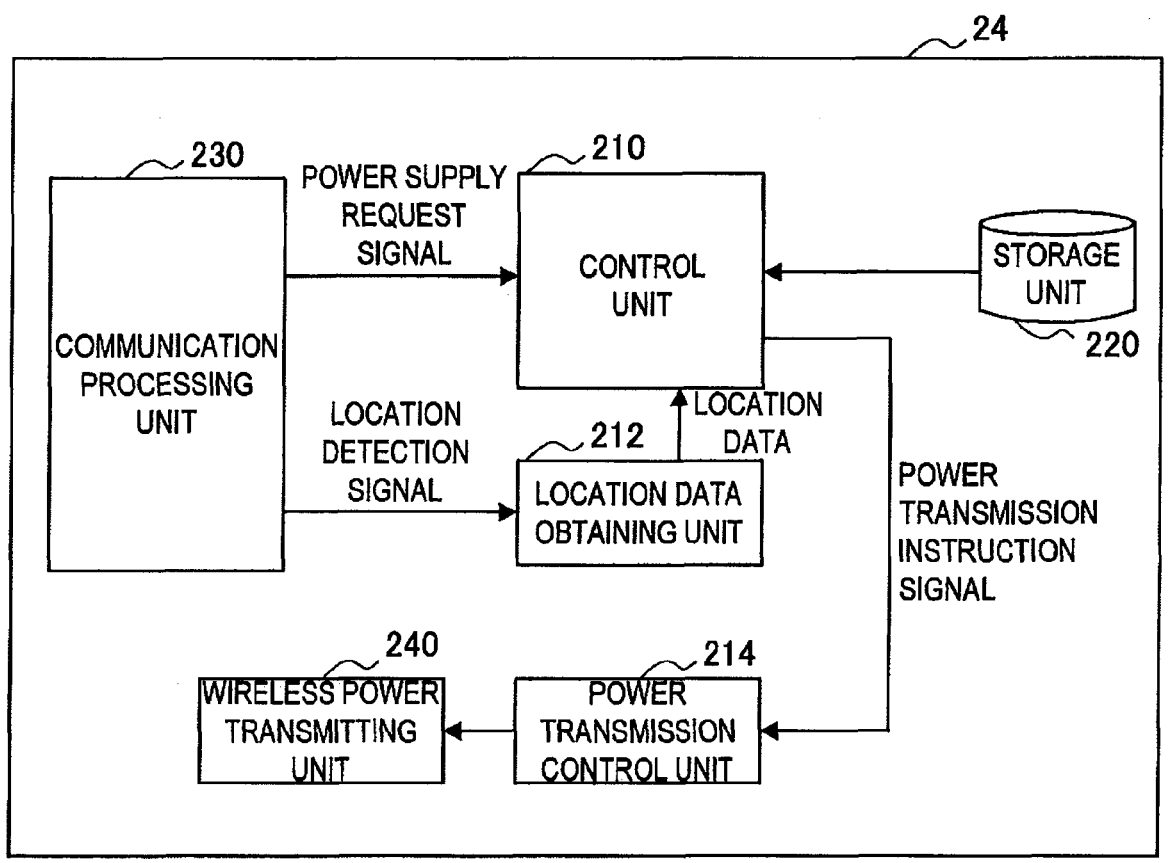
FIG. 16 is a block diagram showing another example of logical, functional arrangement of a second wireless communication apparatus.

FIG. 16 is a block diagram showing logical, functional arrangement of the second wireless communication apparatus 24. As shown in FIG. 16, the second wireless communication apparatus 24 has all functions of the second wireless communication apparatus 14 according to the first embodiment, except the function of the wireless power receiving unit 242. In the present embodiment, a location data obtaining unit 212 of the second wireless communication apparatus 24 estimates a location of the power receiver apparatus 16 using a radio signal received from the power receiver apparatus 16, and outputs location data to a control unit 210.

Figure 17:
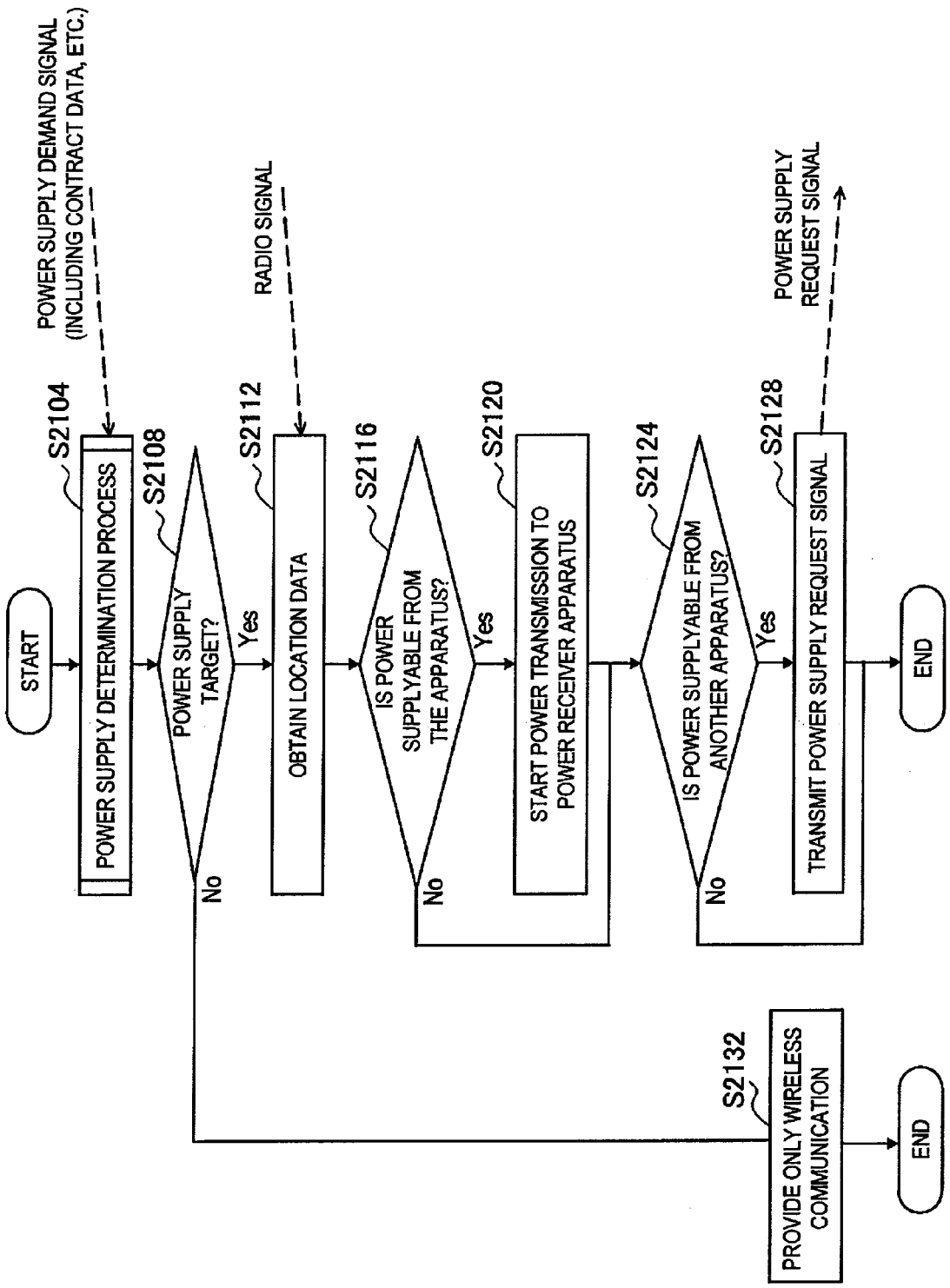
FIG. 17 is a flowchart showing the flow of a process performed by a first wireless communication apparatus according to the second embodiment.

FIG. 17 is a flowchart showing, as an example, the flow of a power supply process performed by the first wireless communication apparatus 12 according to the present embodiment.

Referring to FIG. 17, first, a power supply determination process (the process described using FIG. 10) by a control unit 110 is performed (S2104). The power supply determination process by the control unit 110 can be triggered when, for example, a power supply demand signal including contract data, circuit data, or amount-of-remaining-power data from the power receiver apparatus 16 is received. Thereafter, the process branches off according to a result of the power supply determination process (S2108).

If at S2108 it is determined, as a result of the power supply determination process, not to perform power supply, then power supply to the power receiver apparatus 16 is not performed and only wireless communication with the first wireless communication apparatus 12 is provided (S2132).

On the other hand, if at S2108 it is determined to perform power supply to the power receiver apparatus 16, then the location data obtaining unit 212 estimates a location of the power receiver apparatus 16 using a radio signal received from the power receiver apparatus 16, and thereby obtains location data. The location data of the power receiver apparatus 16 obtained here is passed to the control unit 110 (S2112).

The control unit 110 then determines based on the passed location data of the power receiver apparatus 16 whether the power receiver apparatus 16 is located within a power supplyable range from the first wireless communication apparatus 12 (S2116). If it is determined that the power receiver apparatus 16 is located within a power supplyable range from the first wireless communication apparatus 12, then the control unit 110 outputs a power transmission instruction signal to a power transmission control unit 114, whereby power transmission from a wireless power transmitting unit 140 to the power receiver apparatus 16 starts (S2120). Thereafter, the control unit 110 determines whether the power receiver apparatus 16 is located within a power supplyable range from another wireless communication apparatus (S2124).

On the other hand, if it is determined that the power receiver apparatus 16 is located outside a power supplyable range from the first wireless communication apparatus 12, then the control unit 110 does not perform power transmission from the first wireless communication apparatus 12 but moves to a determination as to whether the power receiver apparatus 16 is located within a power supplyable range from another wireless communication apparatus (S2124).

The determination at S2124 may be performed such that, for example, a location data obtaining unit 112 obtains location data of another wireless communication apparatus stored in advance in a storage unit 120 and the control unit 110 compares the obtained location data with the location data of the power receiver apparatus 16. Instead of that, the location data obtaining unit 112 may estimate a location of another wireless communication apparatus using the techniques described in connection with FIGS. 11 and 12 for estimating a location of a source apparatus of a radio signal.

If at S2124 it is determined that the power receiver apparatus 16 is not located within a power supplyable range from another wireless communication apparatus, then power supply to the power receiver apparatus 16 is not performed and only wireless communication with the first wireless communication apparatus 12 is provided (S2132).

Meanwhile, for example, in the circumstances shown in FIG. 15, it is determined that the power receiver apparatus 16 is located within a power supplyable range from the second wireless communication apparatus 24. In such a case, the control unit 110 transmits a power supply request signal to the second wireless communication apparatus 24 through a communication processing unit 130 (S2128).

Note that although here the description is made assuming that only the second wireless communication apparatus 24 is present as another wireless communication apparatus, a plurality of other wireless communication apparatuses may be present. Namely, at S2128, the control unit 110 of the first wireless communication apparatus 12 may transmit a power supply request signal to each of a plurality of other wireless communication apparatuses that can supply power to the power receiver apparatus 16.

Figure 18:
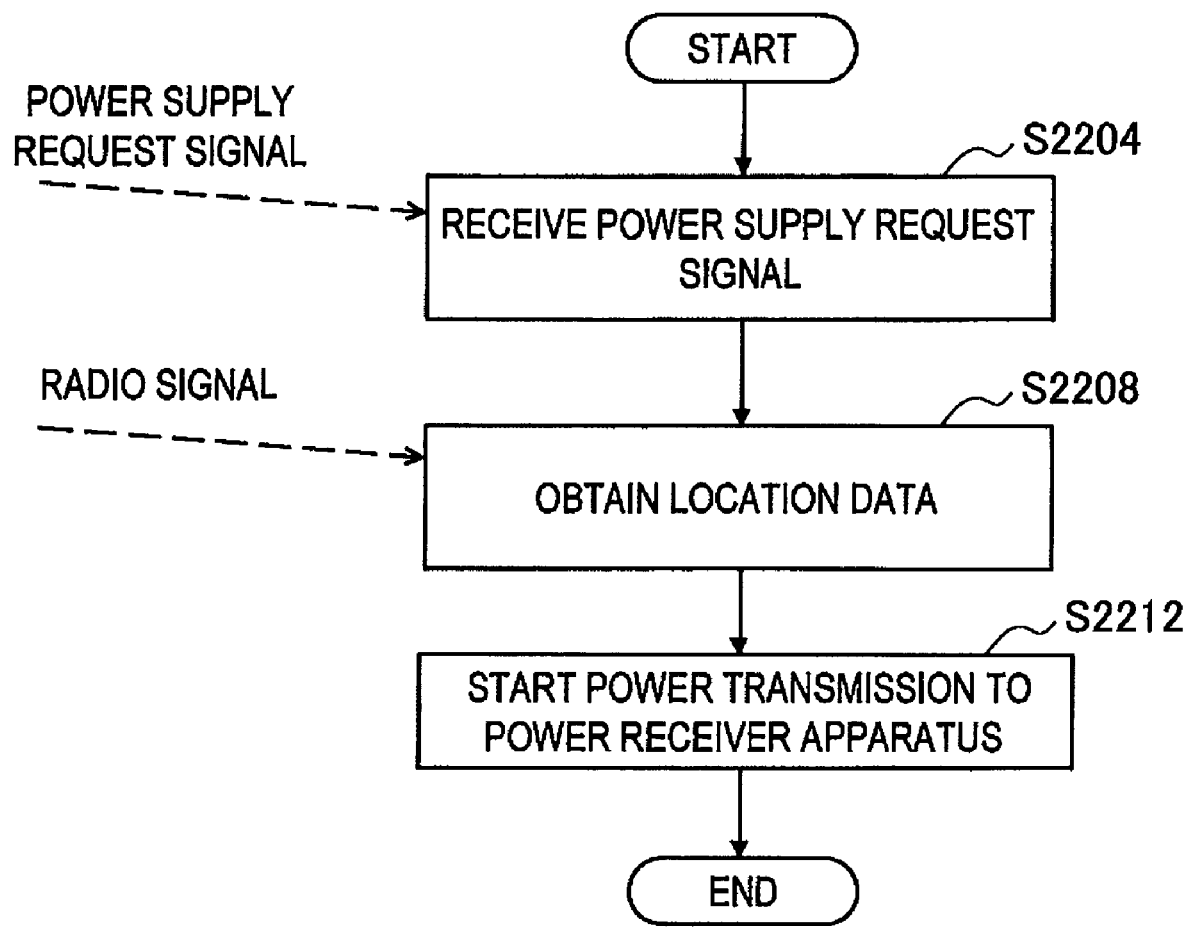
FIG. 18 is a flowchart showing the flow of a process performed by the second wireless communication apparatus according to the second embodiment.

FIG. 18 is a flowchart showing the flow of a power supply process performed by the second wireless communication apparatus 24 during the process described using FIG. 17, in which the second wireless communication apparatus 24 receives a power transmission request signal transmitted from the first wireless communication apparatus 12 and performs power supply to the power receiver apparatus 16.

Referring to FIG. 18, first, a communication processing unit 230 of the second wireless communication apparatus 24 receives a power supply request signal transmitted from the first wireless communication apparatus 12 (S2204). The control unit 210 recognizes that the power supply target is the power receiver apparatus 16 based on data included in the power supply request signal.

Subsequently, the location data obtaining unit 212 of the second wireless communication apparatus 24 estimates a location of the power receiver apparatus 16 using a radio signal received from the power receiver apparatus 16, and thereby obtains location data. The location data of the power receiver apparatus 16 obtained here is passed to the control unit 210 (S2208).

Thereafter, the control unit 210 of the second wireless communication apparatus 24 outputs a power transmission instruction signal to a power transmission control unit 214, to start power supply from a wireless power transmitting unit 240 to the power receiver apparatus 16 (S2212).

The flow of a power supply process to the power receiver apparatus 16 according to the second embodiment has been described so far using FIGS. 17 and 18.

In the present embodiment, the location data obtaining unit 112 of the first wireless communication apparatus 12 obtains location data of the power receiver apparatus 16. Then, using the location data of the power receiver apparatus 16, the control unit 110 of the first wireless communication apparatus 12 determines whether the power receiver apparatus 16 is located within a power supplyable range from another wireless communication apparatus. Herein, when, for example, it is determined that the power receiver apparatus 16 is located within a power supplyable range from the second wireless communication apparatus 24, the first wireless communication apparatus 12 transmits a power supply request signal to the second wireless communication apparatus 24. Then, after the second wireless communication apparatus 24 received the power supply request signal from the first wireless communication apparatus 12, the second wireless communication apparatus 24 lets the wireless power transmitting unit 240 supply power to the power receiver apparatus 16.

Herein, when the control unit 110 of the first wireless communication apparatus 12 determined that the power receiver apparatus 16 is within a power supplyable range from the first wireless communication apparatus 12, the control unit 110 further lets the wireless power transmitting unit 140 supply power to the power receiver apparatus 16.

According to this configuration, when the power receiver apparatus 16 is located within both power supplyable ranges from the first wireless communication apparatus 12 and the second wireless communication apparatus 24, power is supplied parallel to the power receiver apparatus 16 from the first wireless communication apparatus 12 and the second wireless communication apparatus 24. Hence, power supply to the power receiver apparatus 16 can be performed at high speed.

Further, in the present embodiment, the location data obtaining unit 212 of the second wireless communication apparatus 24 estimates location data of the power receiver apparatus 16, using a radio signal received from the power receiver apparatus 16 through the communication processing unit 230. According to this configuration, the second wireless communication apparatus 24 can recognize location data of the power receiver apparatus 16 and perform, for example, directivity control of a power transmitting antenna which is described above in connection with the first embodiment.

Note that, as described in connection with FIG. 7, for example, in the first embodiment, the first wireless communication apparatus 12 determines whether the power receiver apparatus 16 is located within a power supplyable range, using data on a power supplyable range stored in advance in the storage unit 120. The data on a power supplyable range used here is represented by, for example, the value of a power supplyable distance from the first wireless communication apparatus 12. Such data is typically grasped beforehand through an experiment where power supply is actually performed, or the like, and converted into numbers and the resulting numerical value is held in the storage unit 120.

Here, for example, taking into account that the power supplyable range varies with a change in surrounding environment, the power supply state of the first wireless communication apparatus 12 itself, or the like, the data on a power supplyable range may be dynamically updated. Dynamic update to the data on a power supplyable range can be performed by each terminal reporting a power reception status periodically or at any point in time to the first wireless communication apparatus 12, using a wireless communication function.

FIG. 23 is a schematic diagram showing an example of a process of dynamically updating data on a power supplyable range. In FIG. 23, a first wireless communication apparatus 12 first stores in advance a power supplyable range 12$b$ figured out through an experiment. The power supplyable range 12$b$ indicates a distance of 2 [m] from the first wireless communication apparatus 12. It is assumed that thereafter power supply to two power receiver terminals 17 and 18 located within the power supplyable range 12$b$ starts and the first wireless communication apparatus 12 receives reports about power reception statuses from the respective terminals. Herein, the power reception status reported from the power receiver terminal 17 indicates distance D1 and power reception level Lv2. The power reception status reported from the power receiver terminal 18 indicates distance D2 and power reception level Lv1. Based on such reports, the first wireless communication apparatus 12 determines a distance at which the power reception level becomes zero, according to an attenuation model of the power reception level. In FIG. 23, the first wireless communication apparatus 12 calculates based on the power reception statuses reported from the power receiver terminals 17 and 18, a current power supplyable range 12$c$ to be a distance of 1.5 [m], according to a linear model and dynamically updates the data on a power supplyable range (the arrow in the drawing).

Note that the attenuation model of the power reception level depends on the power supply schemes described using FIGS. 19 to 22. The attenuation model of the power reception level is not limited to the linear model shown in FIG. 23 and may be, for example, a model in which the power reception level and the distance are inversely proportional to each other. For the power reception level to be used for reporting power reception statuses, a received-power value converted to power, the strength of a magnetic field or the intensity of received laser light, according to a power supply scheme, or the like, may be used.

Part or all of the functions of the first wireless communication apparatus 12, the second wireless communication apparatus 24, and the power receiver apparatus 16 according to the second embodiment may be implemented as a computer program. For example, when the functions of the second wireless communication apparatus 24 are implemented as a computer program, the program is, for example, stored in a storage unit 220 and loaded into a RAM of the control unit 210 and then executed by a CPU.

Note that the steps of power supply processes according to the first and second embodiments may not necessarily need to be performed in the order described in the flowcharts. Each step performed by the first wireless communication apparatus 12 and the second wireless communication apparatuses 14 and 24 may include operations to be performed parallel or individually.

Note also that the functional blocks of the first wireless communication apparatus 12 and the second wireless communication apparatuses 14 and 24 shown in FIGS. 7, 8, and 16 can be configured by hardware and a series of processing operations can be implemented by hardware logic.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2008-108135 filed in the Japan Patent Office on Apr. 17, 2008, the entire content of which is hereby incorporated by reference.

What is claimed is:

1. A wireless communication apparatus comprising:
   a communication processing unit that transmits and receives a radio signal;
   a wireless power transmitting unit that supplies power wirelessly to an apparatus located within a power supplyable range;
   a location data obtaining unit that obtains location data of a power receiver apparatus; and
   a control unit that controls a power supply from the apparatus located within a power supplyable range to the power receiver apparatus based on the location data of the power receiver apparatus obtained by the location data obtaining unit.

2. The wireless communication apparatus according to claim 1, wherein when the control unit determines based on the location data that the power receiver apparatus is within a power supplyable range from another wireless communication apparatus, the control unit transmits a power supply request signal requesting a power supply for the power receiver apparatus from the another wireless communication apparatus.

3. The wireless communication apparatus according to claim 2, wherein when the control unit determines based on the location data that the power receiver apparatus is within a power supplyable range from another wireless communication apparatus, the control unit further transmits the location data to the another wireless communication apparatus.

4. The wireless communication apparatus according to claim 2, wherein when the control unit determines that the another wireless communication apparatus is within a power supplyable range from the wireless communication apparatus, the control unit further lets the wireless power transmitting unit supply power to the another wireless communication apparatus.

5. The wireless communication apparatus according to claim 2, wherein when the control unit determines that the power receiver apparatus is within a power supplyable range from the wireless communication apparatus, the control unit further lets the wireless power transmitting unit supply power to the power receiver apparatus.

6. The wireless communication apparatus according to claim 1, wherein the control unit determines whether to perform power supply, using contract data, circuit data, or amount-of-remaining-power data which are transmitted from the power receiver apparatus.

7. The wireless communication apparatus according to claim 1, wherein when the control unit receives a power supply request signal requesting a power supply for the power receiver apparatus from another wireless communication apparatus, the control unit lets the wireless power transmitting unit supply power to the power receiver apparatus.

8. The wireless communication apparatus according to claim 7, further comprising a wireless power receiving unit that receives a power supply from another wireless communication apparatus,
   wherein when the control unit receives a power supply request signal from the another wireless communication apparatus, the control unit lets the wireless power receiving unit receive a power supply from the another wireless communication apparatus and lets the wireless power transmitting unit supply power to the power receiver apparatus.

9. The wireless communication apparatus according to claim 7, wherein the location data obtaining unit obtains location data contained in a radio signal received from the another wireless communication apparatus through the communication processing unit.

10. The wireless communication apparatus according to claim 1, wherein the location data obtaining unit estimates location data of the power receiver apparatus, using a radio signal received from the power receiver apparatus through the communication processing unit.

11. A wireless communication apparatus comprising:
    a communication processing unit that transmits and receives a radio signal;
    a wireless power transmitting unit that supplies power wirelessly to an apparatus located within a power supplyable range;
    a location data obtaining unit that obtains location data of a power receiver apparatus; and
    a control unit that controls a power supply to the power receiver apparatus based on the location data of the power receiver apparatus obtained by the location data obtaining unit;
    wherein when the control unit determines based on the location data that the power receiver apparatus is within a power supplyable range from another wireless communication apparatus, the control unit transmits a power supply request signal requesting a power supply for the power receiver apparatus from the another wireless communication apparatus.

12. The wireless communication apparatus according to claim 11, wherein when the control unit determines based on the location data that the power receiver apparatus is within a power supplyable range from another wireless communication apparatus, the control unit further transmits the location data to the another wireless communication apparatus.

13. The wireless communication apparatus according to claim 11, wherein when the control unit determines that the another wireless communication apparatus is within a power supplyable range from the wireless communication apparatus, the control unit further lets the wireless power transmitting unit supply power to the another wireless communication apparatus.

14. The wireless communication apparatus according to claim 11, wherein when the control unit determines that the power receiver apparatus is within a power supplyable range from the wireless communication apparatus, the control unit further lets the wireless power transmitting unit supply power to the power receiver apparatus.

15. The wireless communication apparatus according to claim 11, wherein the control unit determines whether to perform power supply, using contract data, circuit data, or amount-of-remaining-power data which are transmitted from the power receiver apparatus.

16. The wireless communication apparatus according to claim 11, wherein when the control unit receives a power supply request signal requesting a power supply for the power receiver apparatus from another wireless communication apparatus, the control unit lets the wireless power transmitting unit supply power to the power receiver apparatus.

17. The wireless communication apparatus according to claim 16, further comprising a wireless power receiving unit that receives a power supply from another wireless communication apparatus, wherein when the control unit receives a power supply request signal from the another wireless communication apparatus, the control unit lets the wireless power receiving unit receive a power supply from the another wireless communication apparatus and lets the wireless power transmitting unit supply power to the power receiver apparatus.

18. The wireless communication apparatus according to claim 16, wherein the location data obtaining unit obtains location data contained in a radio signal received from the another wireless communication apparatus through the communication processing unit.

19. The wireless communication apparatus according to claim 11, wherein the location data obtaining unit estimates location data of the power receiver apparatus, using a radio signal received from the power receiver apparatus through the communication processing unit.

20. A method for supplying power comprising the steps of:
obtaining location data of a power receiver apparatus by a first wireless communication apparatus that is not located within a power supplyable range of the power receiver apparatus, using a radio signal;
controlling a power supply to the power receiver apparatus based on the obtained location data of the power receiver apparatus; and
supplying power wirelessly from a second wireless communication apparatus to the power receiver apparatus when the power receiver apparatus is located within a power supplyable range from the second wireless communication apparatus.

21. A non-transitory computer-readable storage medium for causing a computer that controls a wireless communication apparatus to function as:
a communication processing unit that transmits and receives a radio signal;
a power transmission control unit that controls a power supply from a wireless power transmitting unit to an apparatus located within a power supplyable range;
a location data obtaining unit that obtains location data of a power receiver apparatus; and
a control unit that provides instructions for supplying power from the apparatus located within a power supplyable range to the power receiver apparatus, to the power transmission control unit based on the location data of the power receiver apparatus obtained by the location data obtaining unit.

22. A wireless communication system comprising:
a first wireless communication apparatus including:
a first communication processing unit that transmits and receives a radio signal;
a first wireless power transmitting unit that supplies power wirelessly to an apparatus located within a power supplyable range from the first wireless communication apparatus;
a first location data obtaining unit that obtains location data of a power receiver apparatus; and
a first control unit that controls a power supply to the power receiver apparatus based on the location data of the power receiver apparatus obtained by the first location data obtaining unit,
a second wireless communication apparatus including:
a second communication processing unit that transmits and receives a radio signal; and
a second wireless power transmitting unit that supplies power to the power receiver apparatus, after receiving a power supply request signal requesting a power supply for the power receiver apparatus, from the first wireless communication apparatus, and
the power receiver apparatus including:
a wireless power receiving unit that wirelessly receives a power supply from the first wireless power transmitting unit of the first wireless communication apparatus or the second wireless power transmitting unit of the second wireless communication apparatus.

23. A non-transitory computer-readable storage medium for causing a computer that controls a wireless communication apparatus to function as:
a communication processing unit that transmits and receives a radio signal;
a power transmission control unit that controls a power supply from a wireless power transmitting unit to an apparatus located within a power supplyable range;
a location data obtaining unit that obtains location data of a power receiver apparatus; and
a control unit that provides instructions for supplying power to the power receiver apparatus, to the power transmission control unit based on the location data of the power receiver apparatus obtained by the location data obtaining unit;
wherein when the control processing unit determines based on the location data that the power receiver apparatus is within a power supplyable range from another wireless communication apparatus, the control unit transmits a power supply request signal requesting a power supply for the power receiver apparatus from the another wireless communication apparatus.

* * * * *